(12) United States Patent
Stolzfus et al.

(10) Patent No.: US 10,575,478 B2
(45) Date of Patent: Mar. 3, 2020

(54) AEROPONIC GROWING COLUMN AND SYSTEM

(71) Applicant: Aero Development Corp, Wilmington, DE (US)

(72) Inventors: Samuel A. Stolzfus, Gap, PA (US); Stephen F. Beiler, Quarryville, PA (US); Conrad F. Fendler, Malvern, PA (US)

(73) Assignee: Aero Development Corp., Wilmington, DE (US)

( * ) Notice: Subject to any disclaimer, the term of this patent is extended or adjusted under 35 U.S.C. 154(b) by 0 days.

(21) Appl. No.: 16/025,362

(22) Filed: Jul. 2, 2018

(65) Prior Publication Data

US 2018/0325056 A1 Nov. 15, 2018

Related U.S. Application Data

(63) Continuation of application No. 14/925,093, filed on Oct. 28, 2015, now abandoned.

(60) Provisional application No. 62/072,098, filed on Oct. 29, 2014.

(51) Int. Cl.
*A01G 31/06* (2006.01)

(52) U.S. Cl.
CPC ............ *A01G 31/06* (2013.01); *Y02P 60/216* (2015.11)

(58) Field of Classification Search
CPC ......... A01G 31/06; A01G 31/02; A01G 9/022
See application file for complete search history.

(56) References Cited

U.S. PATENT DOCUMENTS

| 120,078 A | * | 10/1871 | Leslie | A01G 9/022 47/39 |
|---|---|---|---|---|
| 4,216,617 A | | 8/1980 | Schmidt | |
| 4,574,520 A | | 3/1986 | Arledge | |
| 5,265,376 A | | 11/1993 | Less | |
| 5,276,997 A | | 1/1994 | Swearengin | |
| 5,533,302 A | | 7/1996 | Lynch et al. | |

(Continued)

FOREIGN PATENT DOCUMENTS

| FR | 1560632 | 3/1969 |
|---|---|---|
| JP | 5495198 B1 | 5/2014 |
| WO | 2011145619 A1 | 11/2011 |

OTHER PUBLICATIONS www.FarmTek.com/farm/supplies/prod1;FarmTek_new_products;pgs113700.html, downloaded Mar. 1, 2016, 2 pages.

(Continued)

*Primary Examiner* — Magdalena Topolski
(74) *Attorney, Agent, or Firm* — Barley Snyder

(57) ABSTRACT

An aeroponic growing column system comprises a plurality of vertical growth columns, a plurality of growing receptacles, and a reservoir base having a first plurality of column receiving holes. The vertical growth columns have an elongated body with a fluid receiving end at a top end, an opposite fluid draining end at a base end, an interior receiving space extending between the fluid receiving end and the fluid draining end, and a plurality of growing receptacle receiving openings positioned on the body. The growing receptacles are positioned in the growing receptacle receiving openings. The fluid draining end of each vertical growth column is removably positioned in a different one of the first plurality of column receiving holes and supported by the reservoir base.

11 Claims, 20 Drawing Sheets

(56) References Cited

U.S. PATENT DOCUMENTS

| | | | |
|---|---|---|---|
| 6,178,692 B1 | 1/2001 | Graven | |
| 6,840,008 B1 | 1/2005 | Bullock et al. | |
| 8,225,549 B2 | 7/2012 | Simmons | |
| 8,505,238 B2 | 8/2013 | Luebbers et al. | |
| 10,136,587 B1* | 11/2018 | Johnson | A01G 9/088 |
| 2002/0040548 A1 | 4/2002 | Ware | |
| 2003/0089037 A1 | 5/2003 | Ware | |
| 2010/0146854 A1 | 6/2010 | Cannon et al. | |
| 2014/0000162 A1 | 1/2014 | Blank | |
| 2014/0223816 A1 | 8/2014 | Parker | |
| 2014/0290137 A1* | 10/2014 | Nagels | A01G 31/06 47/62 R |
| 2015/0223418 A1 | 8/2015 | Collins et al. | |
| 2016/0128288 A1 | 5/2016 | Pettinelli et al. | |
| 2016/0135394 A1 | 5/2016 | Wagner | |
| 2016/0143234 A1 | 5/2016 | Nasu | |
| 2017/0055473 A1 | 3/2017 | Baker | |
| 2017/0347547 A1 | 12/2017 | Lu et al. | |

OTHER PUBLICATIONS http://futuregrowing.com/, downloaded Mar. 1, 2016, 2 pages.
http://www.growerssupply.com/farm/supplies/prod1;gs_hydroponics;pg113700.html, downloaded Mar. 2, 2016, 2 pages.

* cited by examiner

AEROPONIC GROWING COLUMN AND SYSTEM

CROSS-REFERENCE TO RELATED APPLICATIONS

This application is a continuation of U.S. Nonprovisional application Ser. No. 14/925,093, filed on Oct. 28, 2015, which claims priority to U.S. Provisional Application No. 62/072,098, filed Oct. 29, 2014.

FIELD OF THE INVENTION

The invention is generally related to aeroponics, and, more specifically, to an aeroponic growing column and system.

BACKGROUND

Aeroponics are generally soil-less growing systems that involve growing plants with their roots suspended in a chamber. The roots are periodically or continuously subjected to a fine mist or spray of liquefied nutrients.

Conventional aeroponic systems are generally complex in design, expensive to manufacture, and lack scalability. Such disadvantages have precluded widespread use of aeroponic systems.

SUMMARY

An aeroponic growing column system comprises a plurality of vertical growth columns, a plurality of growing receptacles, and a reservoir base having a first plurality of column receiving holes. The vertical growth columns have an elongated body with a fluid receiving end at a top end, an opposite fluid draining end at a base end, an interior receiving space extending between the fluid receiving end and the fluid draining end, and a plurality of growing receptacle receiving openings positioned on the body. The growing receptacles are positioned in the growing receptacle receiving openings. The fluid draining end of each vertical growth column is removably positioned in a different one of the first plurality of column receiving holes and supported by the reservoir base.

BRIEF DESCRIPTION OF THE DRAWINGS

The invention will now be described by way of reference to the accompanying figures, of which.

DETAILED DESCRIPTION OF THE EMBODIMENT(S)

Figure 1:
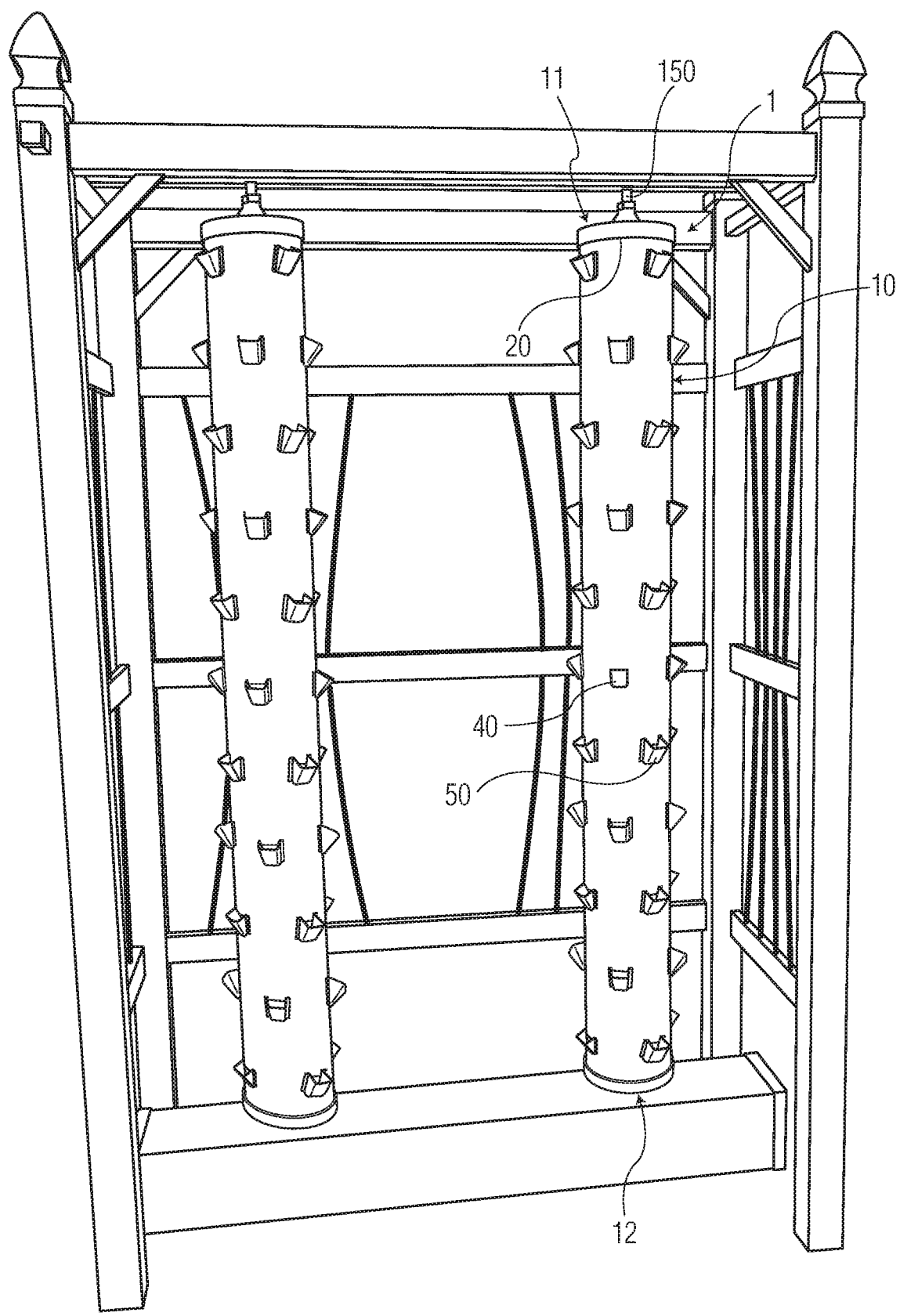
FIG. 1 is a perspective view of an aeroponic growth column.

An embodiment of an aeroponic growing column 1 is disclosed having a first body 10 and a growing receptacle 50.

The first body 10 is elongated and has an exterior surface and an interior surface, a fluid receiving end 11, and a fluid draining end 12 distal to the fluid receiving end 11. The shape of the first body 10 may be cylindrical, square, rectangular, oval or any other shape known to those of ordinary skill in the art. The first body 10 may be made of a plastic material. In an embodiment, the plastic material may be polyethylene, polypropylene, polyvinylchloride, or acrylonitrile butadiene styrene. In another embodiment, the first body 10 may be made of a metal, such as stainless steel, aluminum, or any other metal known to those of ordinary skill in the art.

In an embodiment, the first body 10 includes an interior receiving cavity (not shown), a fluid receiving cap 20, a base cap 30, a plurality of growing receptacle receiving openings 40, and a plurality of growing receptacles 50.

The interior receiving cavity extends the length of the interior of the first body 10. In an embodiment, the interior receiving cavity is hollow. In another embodiment, the interior receiving cavity may include internal support structures.

The fluid receiving cap 20 is positioned on the fluid receiving end 11 of the first body 10 and includes a second body 20a, 20b, a flange 26, and a sprayer receiving hole 22.

Figure 2:
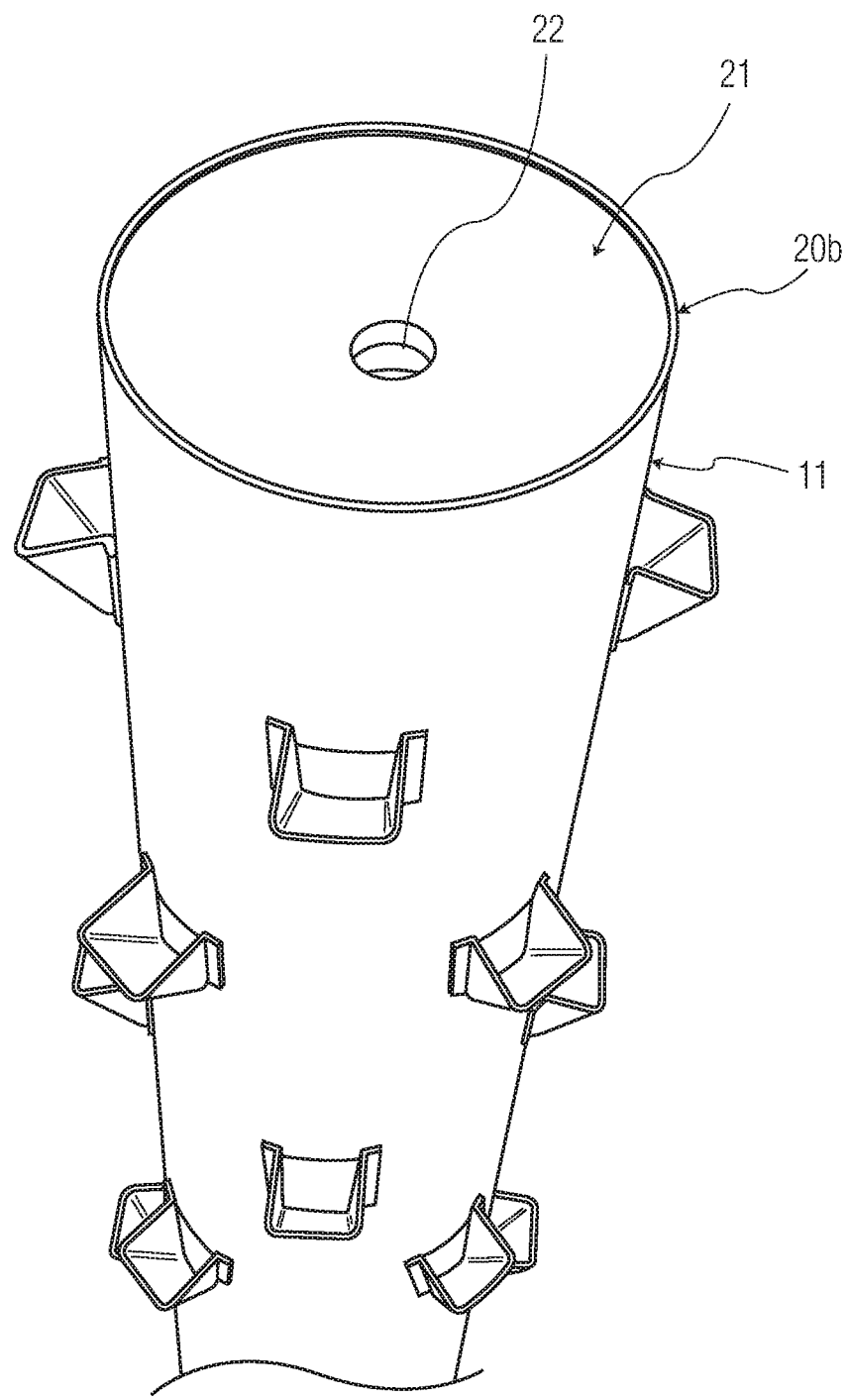
FIG. 2 is a perspective view of a fluid receiving end of the aeroponic growth column.

In an embodiment shown in FIG. 2, the fluid receiving cap 20 is conical, and includes a conical second body 20b that extends into the interior receiving cavity of the first body 10. The sprayer receiving hole 22 is positioned at an apex of the second body 20b, such that the second body 20b slopes towards the sprayer receiving hole 22.

Figure 4A:
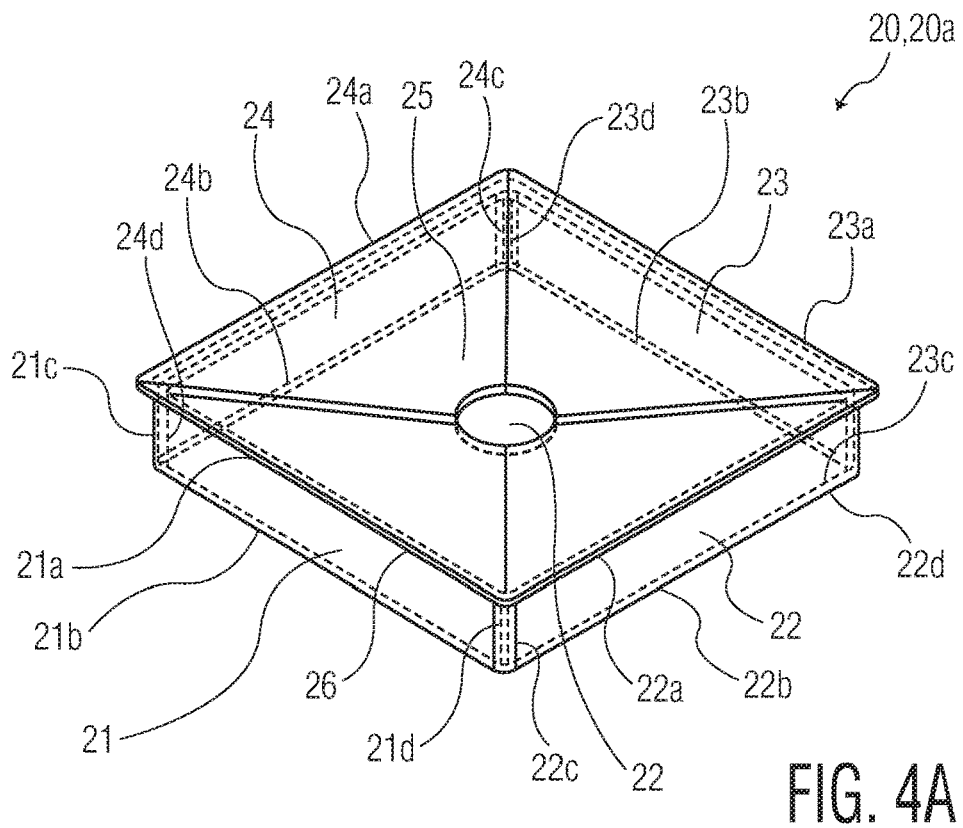
FIG. 4a is a schematic view of a fluid receiving cap.
Figure 4B:
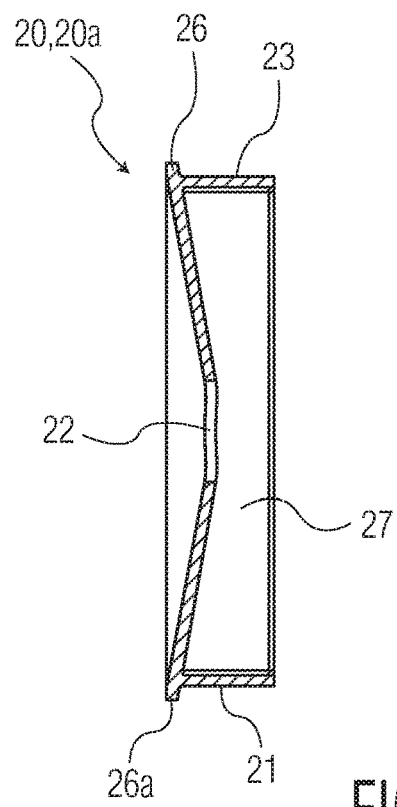
FIG. 4b is a sectional view of the fluid receiving cap.

In an embodiment shown in FIGS. 4a and 4b, the fluid receiving cap 20a is generally square, and has a first sidewall 21, a second sidewall 22, a third sidewall 23, a fourth sidewall 24, and a top wall 25. The first sidewall 21 has a first top edge 21a, an opposing first bottom edge 21b, a first side edge 21c, and an opposing second side edge 21d. The second sidewall 22 has a second top edge 22a, an opposing second bottom edge 22b, a third side edge 22c, and an opposing fourth side edge 22d. The third sidewall 23 has a third top edge 23a, an opposing third bottom edge 23b, a fifth side edge 23c, and an opposing sixth side edge 23d. The fourth sidewall 24 has a fourth top edge 24a, an opposing fourth bottom edge 24b, a seventh side edge 24c, and an opposing eighth side edge 24d. The top wall 25 has a first top wall edge 25a, a second top wall edge 25b, a third top wall edge 25c, and fourth top wall edge 25d.

The first side edge 21c is connected to the eighth side edge 24d, the second side edge 21d is connected to the third side edge 22c, the fourth side edge 22d is connected to the fifth side edge 23c, and the sixth side edge 23d is connected to the seventh side edge 24c. The first top edge 21a is connected to the first top wall edge 25a, the second top edge 22a is connected to the second top wall edge 25b, the third top edge 23a is connected to the third top wall edge 25c, and the fourth top edge 24a is connected to the fourth top wall edge 25d.

Together, the first, second, third and fourth sidewalls 21,22,23,24 and the top wall 25 form the second body 20a. In an embodiment, the first and third sidewalls 21, 23 are approximately equal in length and width, and extend parallel to each other. In another embodiment, the second and fourth sidewalls 22, 24 are approximately equal in length and width, and extend parallel to each other. The first and third sidewalls 21, 23 extend perpendicular to the second and fourth sidewalls 22, 24. An interior receiving cavity 27 is disposed in the interior of the second body 20a.

A distance between an outer surface of the first and third sidewalls 21, 23 is less than a diameter of the interior receiving cavity of the aeroponic growing column 1 described above. A distance between an outer surface of the second and fourth sidewalls 22, 24 is less than the diameter of the interior receiving cavity of the aeroponic growing column 1 described above.

In an embodiment shown in FIGS. 4a and 4b, the top wall 25 is concave and extends into the interior receiving cavity 27. In an embodiment, the top wall 25 has a concave, cone-like shape. In an embodiment shown in FIG. 4a, the top wall 25 has four triangular elements extending inward into the interior receiving cavity 27, where each triangular element sits on a plane that extends obliquely from a plane formed by the first, second, third, and fourth top edges 21a,22a,23a,24a. In another embodiment, the top wall 25 is flat or convex.

The sprayer receiving hole 22 extends from a top surface to a bottom surface of the top wall 25 to form a through-hole. In an embodiment, when the top wall 25 is concave or convex, the sprayer receiving hole 22 is positioned at an apex of the second body 20a, 20b such that the second body 20a, 20b slopes towards the sprayer receiving hole 22. The slope of the second body 20a, 20b creates a funnel that slopes towards the sprayer receiving hole 22 to prevent fluid leakage outside the first body 10. In another embodiment, when the second body 20a, 20b is flat, the sprayer receiving hole 22 is positioned at an approximate center of the top wall 25.

The flange 26 is positioned along the top edges 21a, 22a, and 23a, 24a of the sidewalls 21,22,23,24 or along the single sidewall when the sidewall is circular. The diameter of an outer circumferential edge 26a of the flange 26 is equal to a diameter of the fluid receiving end 11 of the first body 10 for the aeroponic growing column 1.

To install the fluid receiving cap 20 on the aeroponic growing column 1, the fluid receiving cap 20 is positioned on the fluid receiving end 11 of the first body 10 such that the second body 20a,20b extends into the interior receiving cavity of the first body 10. The flange 26 rests on the fluid receiving end 11 and the outer circumferential edge 26a is flush with the outer surface of the first body 10.

Figure 3:
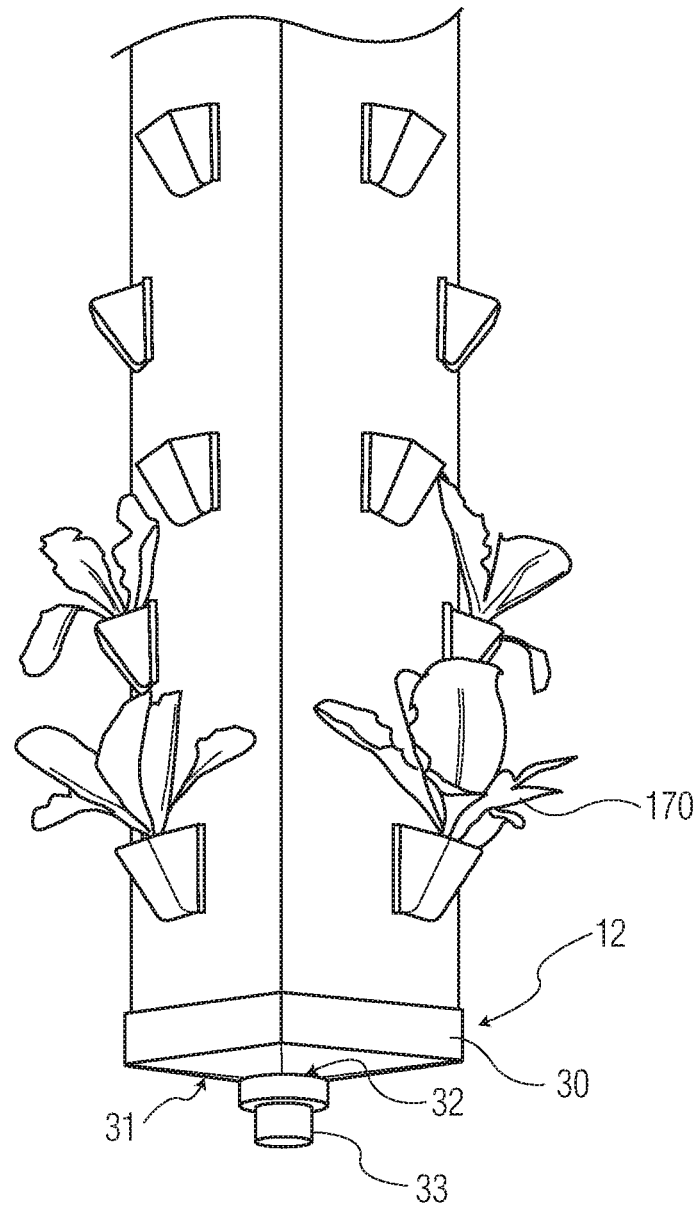
FIG. 3 is a perspective view of a fluid draining end of the aeroponic growth column.

In an embodiment shown in FIG. 3, the base cap 30 is positioned on the fluid draining end 12 of the first body 10 and includes a third body 31, a drain hole 32, and a drain spout 33.

The third body 31 extends outward, away from the fluid draining end 12 of the first body 10. The drain hole 32 is positioned at an apex of the third body 31, such that the third body 31 slopes towards the drain hole 32. The drain spout 33 is connected to the drain hole 32 and extends outward from the drain hole 32.

The plurality of growing receptacle receiving openings 40 is disposed on the exterior of the first body 10. In an embodiment, the growing receptacle receiving openings 40 are through holes that extend from the exterior surface to the interior surface of the first body 10.

Figure 5:
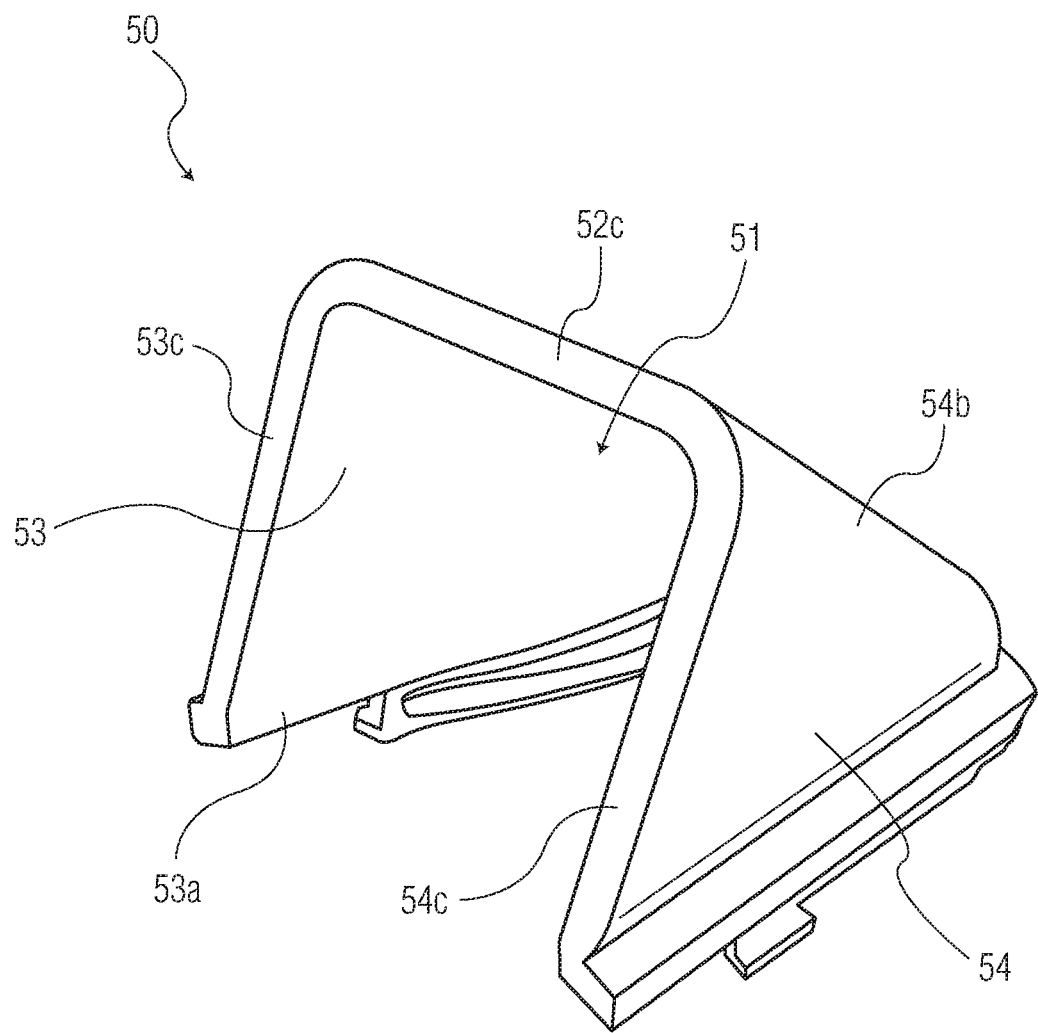
FIG. 5 is a perspective view from an oblique angle of a growth receptacle.
Figure 6:
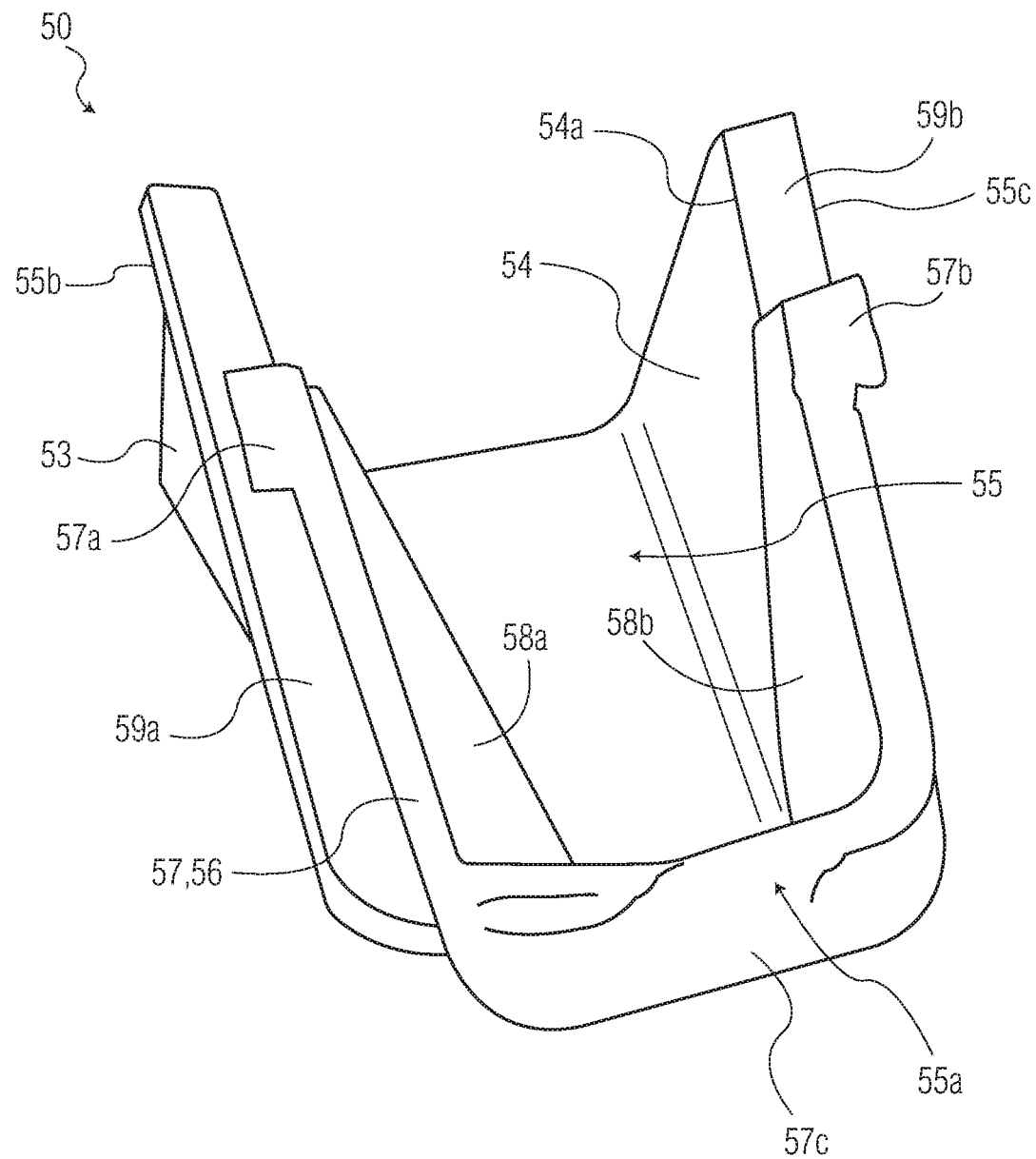
FIG. 6 is a perspective view of a rear of the growth receptacle.
Figure 7:
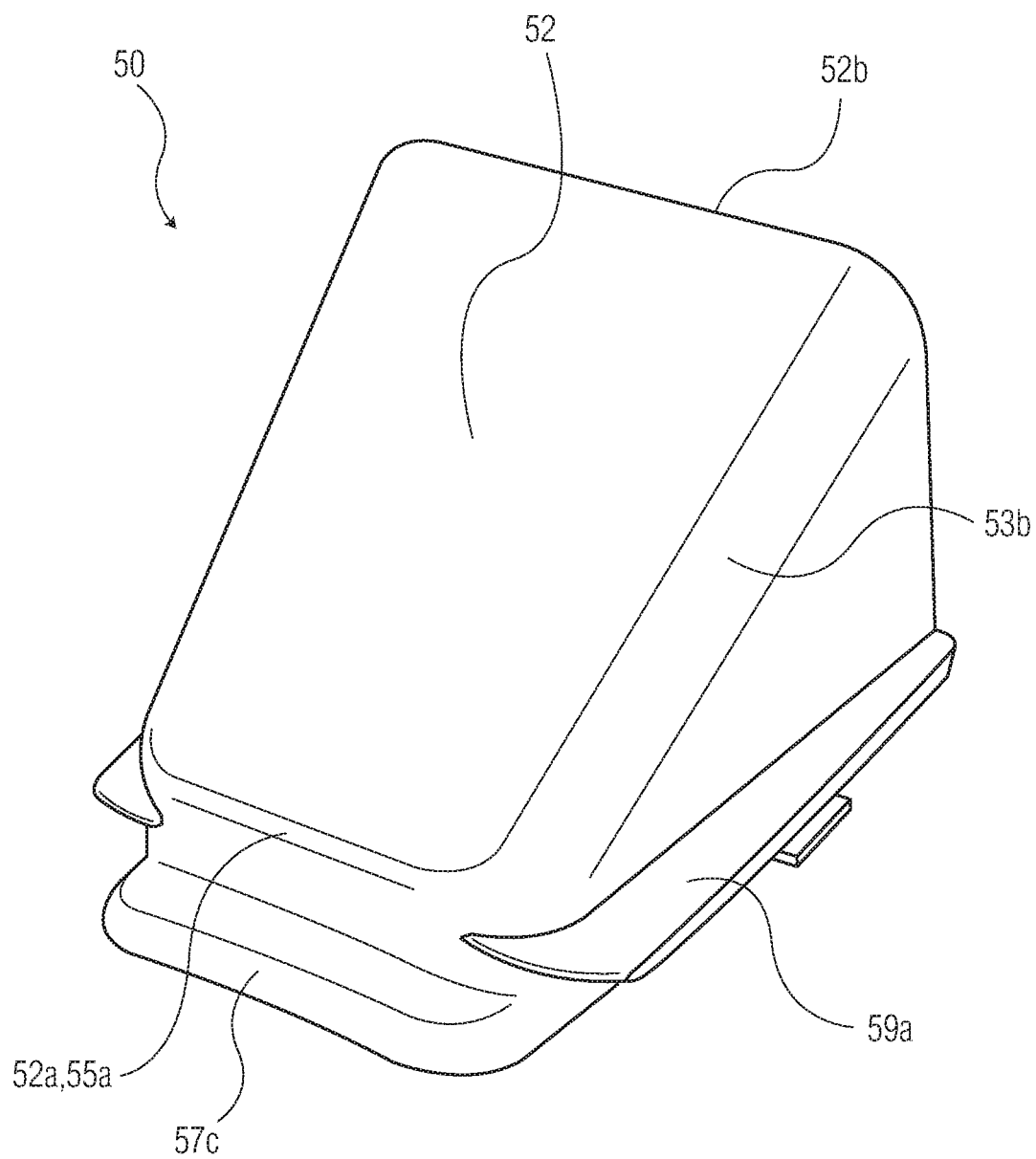
FIG. 7 is a perspective view of a front of the growth receptacle.

As shown in FIGS. 5-7, in an embodiment the plurality of growing receptacles 50 each include a rear opening 55, a top opening 51, a front wall 52, a first sidewall 53, and a second sidewall 54.

The rear opening 55 sits on a first plane, and is positionable over the growing receptacle receiving opening 40.

The front wall 52 has a first end 52a extending from the rear opening 55 to define a base side 55a of the rear opening 55, and a second end 52b spaced apart from the first plane of the rear opening 55 and extending away from the first end 52a such that the front wall 52 extends orthogonally away from the first plane. In an embodiment, the front wall 52 extends orthogonally away from the first plane at an angle of 90 degrees or less. In another embodiment, the front wall 52 extends orthogonally away from the first plane at an angle of 45 degrees or less.

The first sidewall 53 has an approximate triangular shape, and a first rear edge 53a extending along the first plane to define a first side 55b of the rear opening 55, and a first front edge 53b continuously in contact with the front wall 52.

The second sidewall 54 has an approximate triangular shape, and a second rear edge 54a extending along the first plane to define a second side 55c of the rear opening 55 opposite the first side 55b. The second side 55c is space apart from the first side 55b by the base side 55a The second sidewall 54 has a second front edge 54b continuously in contact with the front wall 52. The second sidewall 54 extends parallel to the first sidewall 53 from the first plane, and is spaced apart from the first sidewall 53 by the front wall 52.

The top opening 51 sitting on a second plane defined by a first top edge 53c of first sidewall 53, a second top edge 54c of the second sidewall 54, and a top edge 52c of the front wall 52. In an embodiment, the second plane extends orthogonally away from the first plane.

In an embodiment, the growing receptacles 50 have a flange 59. The flange 59 includes a first flange element 59a positioned along the first rear edge 53a of the first sidewall 53, and a second flange element 59b positioned along the second rear edge 54a of the second sidewall 54. The first and second flange elements 59a, 59b extended outward in opposite directions along a common plane that is parallel with the first plane. In an embodiment, the first and second flange element 59a, 59b extend outward in opposite directions along the first plane.

In an embodiment, the growing receptacles 50 are affixed to the column 1 by positioning the rear opening 55 over the growing receptacle receiving openings 40 and contacting the first and second flange elements 59a, 59b to the exterior surface of the first body 10. The growing receptacles 50 can be affixed using an adhesive or cement to form a sealed growing cup.

In an exemplary embodiment, the growing receptacles 50 have a U-shaped protrusion 56 projecting perpendicular to the plane of the rear opening 55, from the base side 55a, first side 55b, and second side 55c. A latching mechanism 57 is positioned on the U-shaped protrusion 56, and includes a first latching protrusion 57a on the first side 55b, a second latching protrusion 57b on the second side 55c, and a camming lip 57c extending from the base side 55a parallel to the first plane of the rear opening 55.

In another exemplary embodiment, the rear opening 55 has an approximate V-shape formed from a first wing 58a positioned proximate to the U-shaped protrusion 56 on the first side 55b, and a second wing 58b positioned proximate to the U-shaped protrusion 56 on the second side 55c. The first wing 58a extends inward from the first sidewall 53, towards the second sidewall 54. The second wing 58b extends inward from the second sidewall 54, towards the first sidewall 53.

In an embodiment, the growing receptacles 50 are affixed to the column 1 by positioning the rear opening 55 over the growing receptacle receiving openings 40, inserting the camming lip 57c into the growing receptacle receiving openings 40 at an angle, tilting the rear opening 55 towards the column 1 to contact the flanges 59a, 59b with the exterior surface of the first body 10, and engaging the first and second latch protrusions 57a, 57b with the growing receptacle receiving openings 40. In another embodiment, an adhesive or cement is used to further attach the growing receptacles 50 to the first body 10. (not shown)

An embodiment of an aeroponic growing column system 100 is disclosed having a reservoir 110, a supply conduit 111, a return conduit 112, a pump 113, a fluid draining base 130, a sprayer 150, the column 1, and a nutrient enriched fluid 160. In another embodiment, the aeroponic growing column system 100 further includes a Grotronic meter 410, a Dosatron 400, a fluid heater 420 or a combination thereof.

The reservoir 110 houses the nutrient enriched fluid 160 and has an outlet connected to the supply conduit 111 and an inlet connected to the return conduit 112.

The supply conduit 111 and the return conduit 112 may be pipes, rigid or flexible tubing, or any other conduit know to those of ordinary skill in the art.

The sprayer 150 is connected to a terminating end of the supply conduit 111 and is in fluid communication with the reservoir 110. The sprayer 150 is positioned vertically over the fluid draining base 130.

The pump 113 is coupled to the reservoir 110 and the supply conduit 111 and supplies the nutrient enriched fluid 160 from the reservoir 110 to the sprayer 150 through the supply conduit 111. In an embodiment, a filter (not shown) can be positioned on the supply conduit, between the reservoir and the sprayer 150 to remove impurities from the nutrient enriched fluid 160. A power supply (not shown) is connected to the pump 113.

The fluid draining base 130 is connected to the return conduit 112 and has a drain spout receiving hole 131. Nutrient enriched fluid 160 enters the fluid draining base 130, through the drain spout receiving hole 130, and into the return conduit 112 to flow back into the reservoir 110.

The column 1, as shown in FIGS. 1-3 and described in the above embodiments, is connected to the supply conduit 111 and reservoir 110, through the sprayer 150. The column 1 is connected to the return conduit 112 and reservoir 110 through the fluid draining base 130.

As shown in FIG. 1, the sprayer 150 is positioned in the sprayer receiving hole 22 and extends into the interior receiving cavity of the first body 10 to hold the column 1 in a vertical position. As seen in FIGS. 1, 3, 8 and 9, the drain spout 33 of the base cap 30 has a diameter that is smaller than a diameter of the drain spout receiving hole 131, such that the drain spout 33 is insertable into the fluid draining base 130 through the drain spout receiving hole 131. The base cap 30 of the column 1 rests on, and is supported by the fluid draining base 130.

Since the base cap 30 is supported by the fluid draining base 130, the column 1 can easily be removed or installed into the aeroponic growing column system 100. To install a column 1, the column 1 is first tilted at an angle to the sprayer 150. Then the sprayer 150 is inserted into the sprayer receiving hole 22. Next, the column 1 is brought into a vertical position over the fluid draining base 130. The column 1 is then lowered such that the drain spout 33 is inserted through the drain spout receiving hole 131, into the fluid draining base 130, until the base cap 30 rests on the fluid draining base 130. To remove the column 1, the process is repeated in reverse.

The nutrient enriched fluid 160 is understood to be a fluid that contains nutrients in a solution. The composition of the nutrient enriched fluid 160 is well known to one of ordinary skill in the art for aeroponic or hydroponic systems. In an embodiment, the nutrient enriched fluid 160 includes minerals such as calcium nitrate, iron, monopotassium phosphate, potassium nitrate, magnesium sulfate, ironic earth minerals, or a combination thereof.

Figure 14:
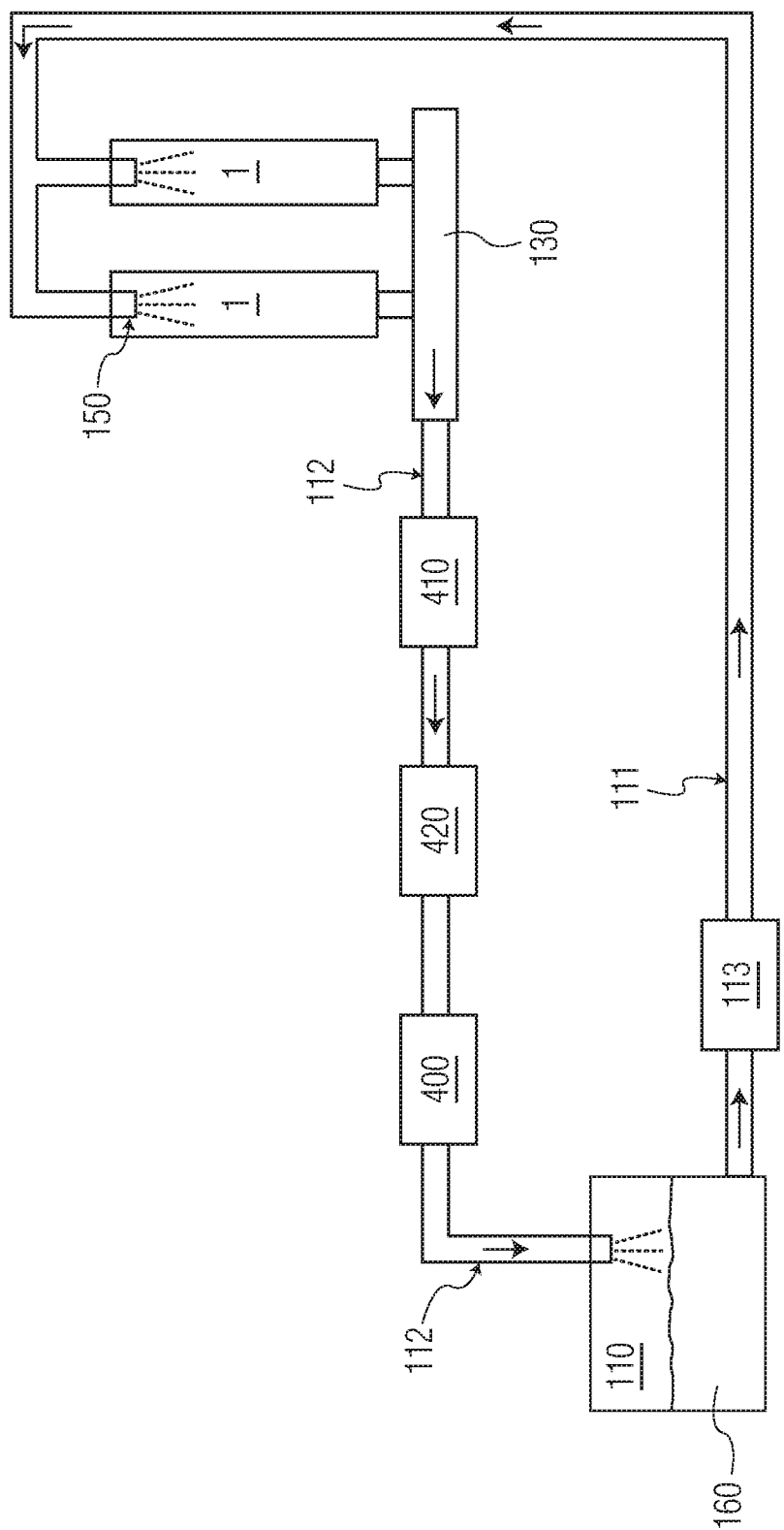
FIG. 14 is a schematic of a portion of the aeroponic growing column system showing nutrient tanks and a boiler.

The Grotronic meter 410 is an instrument that measures the temperature, conductivity, and pH of a fluid. See FIGS. 14 and 15. In an embodiment, the Grotronic meter 410 measures the temperature, conductivity and pH of the nutrient enriched fluid 160. An example of the Grotronic meter 410 is the meters made by YSI, Inc. (www.ysi.com), although those of ordinary skill in the art would appreciate that other brands of meters may also be used to measure the temperature, conductivity and pH of the nutrient enriched fluid 160. In an embodiment, the Grotronic meter 410 measures the temperature, conductivity, and pH of the nutrient enriched fluid 160 in the reservoir 110.

The Dosatron 400 regulates and controls the concentration of the minerals in the nutrient enriched fluid 160. See FIGS. 14 and 15. An example of the Dosatron 400 is the Dosatron systems made by Dosatron International, Inc. (www.Dosatronusa.com), although those of ordinary skill in the art would appreciate that other brands of meters may also be used to regulate and control the concentration of the minerals. The mineral concentrations in the nutrient enriched fluid 160 can be set at pre-determined levels, and the Dosatron 400 will add minerals to the nutrient enriched fluid 160 when the concentration of those minerals fall below the pre-determined levels. In an embodiment, the Dosatron 400 is connected to the Grotronic meter 410, and the pre-determined levels of mineral concentrations are determined by the conductivity and pH levels of the nutrient enriched fluid 160, as measured by the Grotronic meter 410. When the conductivity and/or pH levels of the nutrient enriched fluid 160 detected by the Grotronic meter 410 fall outside the pre-determined levels, the Dosatron 400 injects the deficient minerals to the nutrient enriched fluid 160 to bring the conductivity and/or pH levels back into the pre-determined levels.

In an embodiment, a boiler 420 is connected to a heater conduit 113 connected to a radiant under floor heating system (not shown), and is used to heat the greenhouse to a pre-determined temperature. See FIG. 14. Those skilled in the art will appreciate that the radiant under floor heating system consists of a plurality of pipes and/or radiators through which the hot fluid is circulated by the boiler 420 and conduit 113. Examples of the boiler 420 can be a common water heater or boiler. In an embodiment, the temperature of the greenhouse can be set to a pre-determined level, using known thermostat and control systems to control the heater 420.

The method of operation for the aeroponic growing column system 100 is as follows. The pump 113 pushes the nutrient enriched fluid 160 through the supply conduit 111 from the reservoir 110, upward to the sprayer 150. The sprayer 150 then disperses the nutrient enriched fluid 160 into the interior receiving cavity of the first body 10 of the column 1 as a mist, fog, or spray. The nutrient enriched fluid 160 then travels down the length of the first body 10, from the fluid receiving end 11 to the fluid draining end 12 through the use of gravitational pull. Excess nutrient enriched fluid 160 not used by the growing plants then drains from the column 1 through the drain spout 33 and fluid draining base 130, into the return conduit 112. Once in the return conduit 112, the nutrient enriched fluid 160 flows back to the reservoir 110 to be tested for conductivity, pH, and temperature. If the conductivity, pH, or temperature values are outside the pre-determined levels, the Dosatron 400 will inject the appropriate minerals until the conductivity and pH levels are within the pre-determined levels, and control temperature until the temperature is within the pre-determined level. The nutrient enriched fluid 160 is then reused.

In the embodiments using the filter positioned on the supply conduit, when the pump 113 pushes the nutrient enriched fluid 160 though the supply conduit 111, the nutrient enriched fluid 160 also passes through the filter, and impurities are removed.

Again referring to FIGS. 1-3 and 5-7, the growing receptacle 50 holds a growing plant 170. An upper portion of the plant 170 extends out of growing receptacle 50, through the top opening 51, and is exposed to artificial or natural light. The approximate V-shape of the rear opening 55 of the growing receptacle prevents the plant 170 from falling into the interior receiving cavity of the first body 10. However, the V-shape still allows a root mass on a lower portion of the plant 170 to extend through the rear opening 55 and growing container receiving opening 40, into the interior receiving cavity. The root mass can then be exposed to the nutrient enriched fluid 160 being dispersed by the sprayer 150 from the supply conduit 111. Since the front wall 52 of the growing receptacle 50 extends orthogonally away from the first plane of the rear opening 55, any unused nutrient enriched fluid 160 not absorbed by the exposed root mass will drain away towards the fluid draining end 12 of the first body 10 to be reused.

Figure 8:
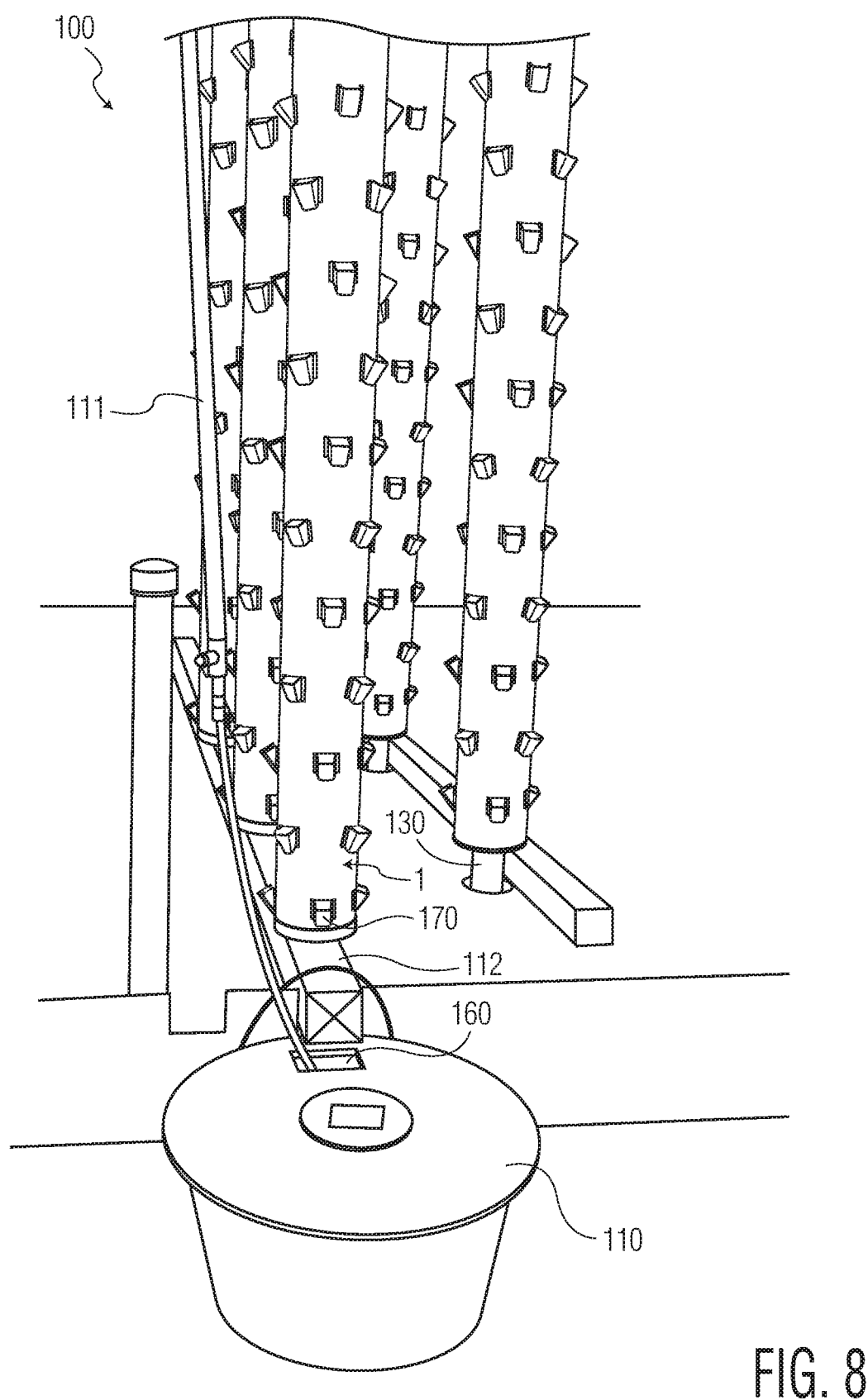
FIG. 8 is a perspective view of an aeroponic growing column system.
Figure 9:
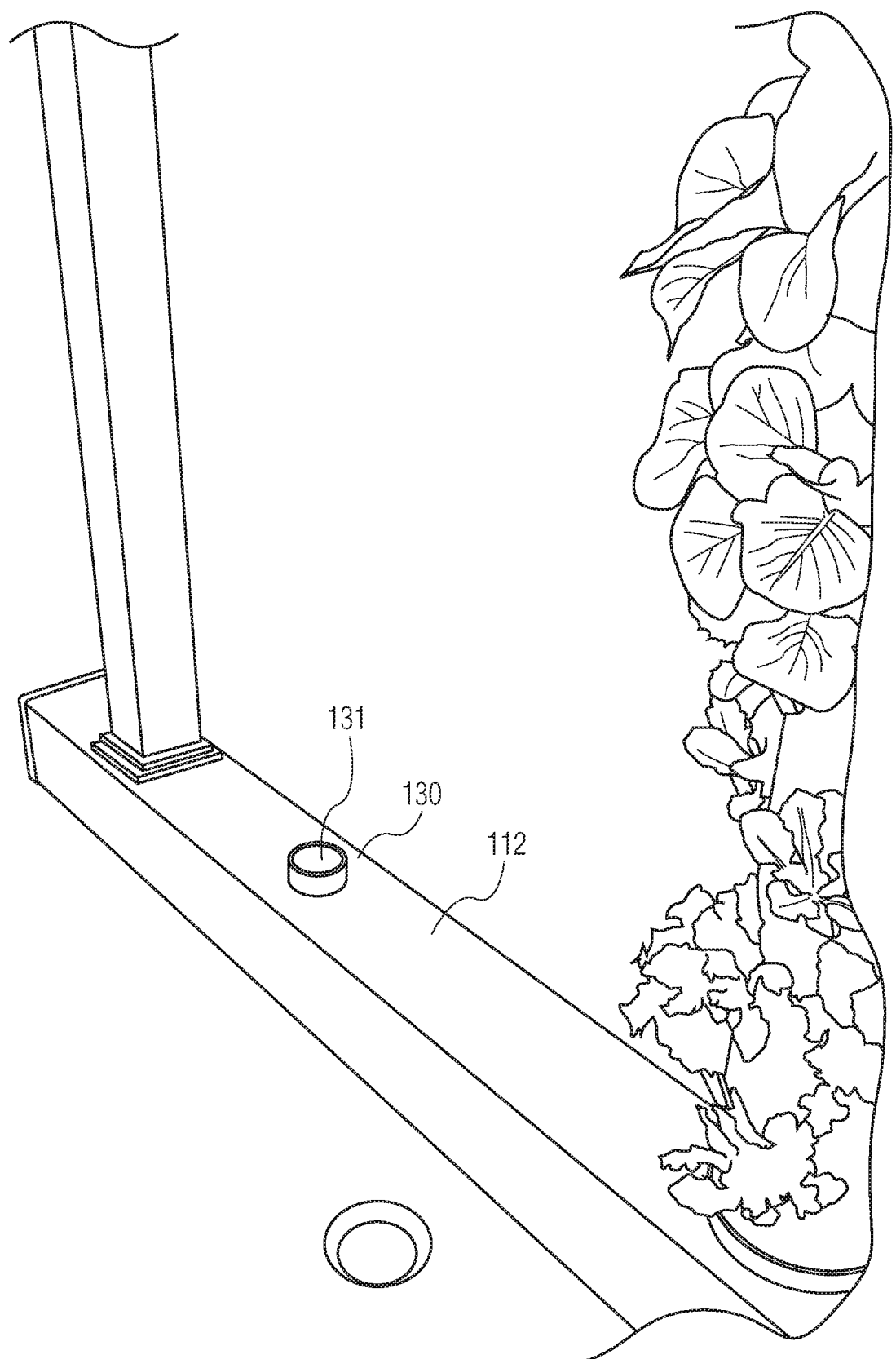
FIG. 9 is a perspective view of a fluid returning base of a return conduit.

In the embodiment shown in FIGS. 1 and 8, the aeroponic growing column system 100, includes a plurality of columns 1, a plurality of fluid draining bases 130, and plurality of sprayers 150. In an embodiment, the plurality of fluid draining bases 130 is connected to the reservoir 110 by a single return conduit 112. In another embodiment, the plurality of fluid draining bases 130 is connected to the reservoir 110 by a plurality of return conduits 112. Similarly, in an embodiment, the plurality of sprayers 150 is connected to the reservoir 110 by a single supply conduit 111. In another embodiment, the plurality of sprayers 150 is connected to the reservoir 110 by a plurality of supply conduits 111.

In another embodiment of the aeroponic growing column 1, the aeroponic growing column 1 further includes a controlled flow reservoir 3. See FIGS. 12 and 13. The controlled flow reservoir 3 includes a reservoir body 300, a plurality of fluid dispersing passageways 306, a flange 310 and a top opening 311.

Figure 12:
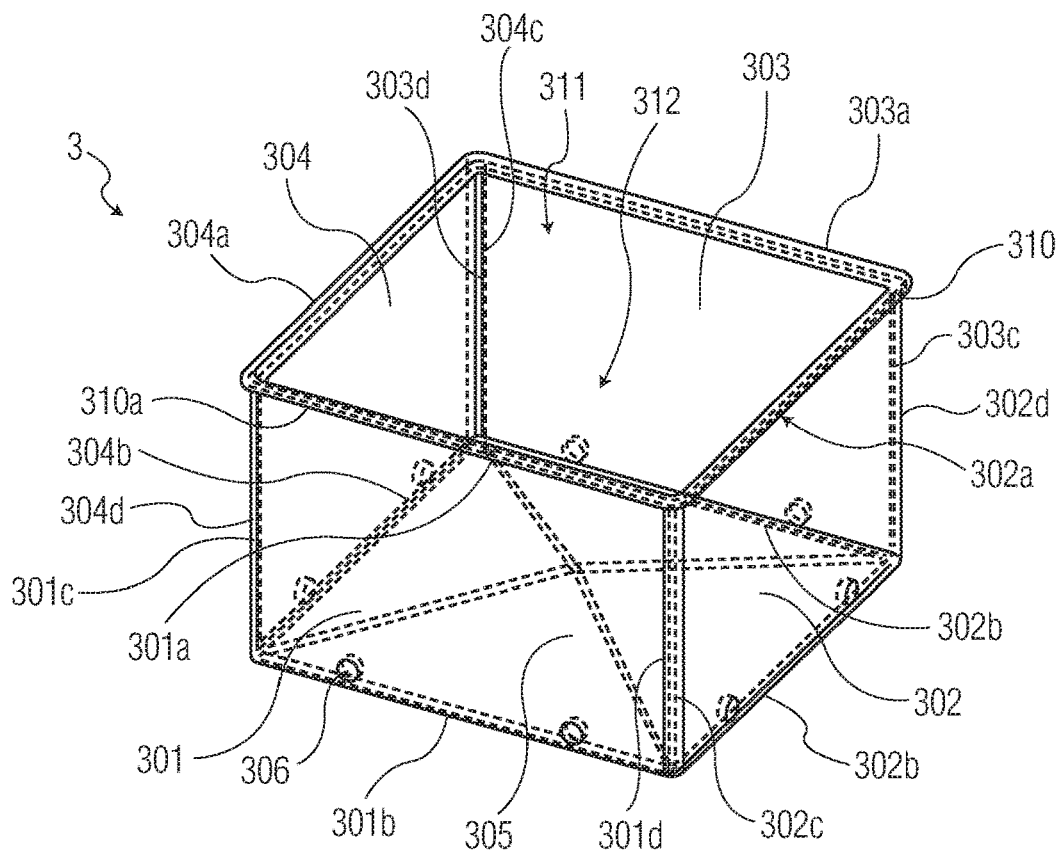
FIG. 12 is a schematic view of a controlled flow reservoir.
Figure 13:
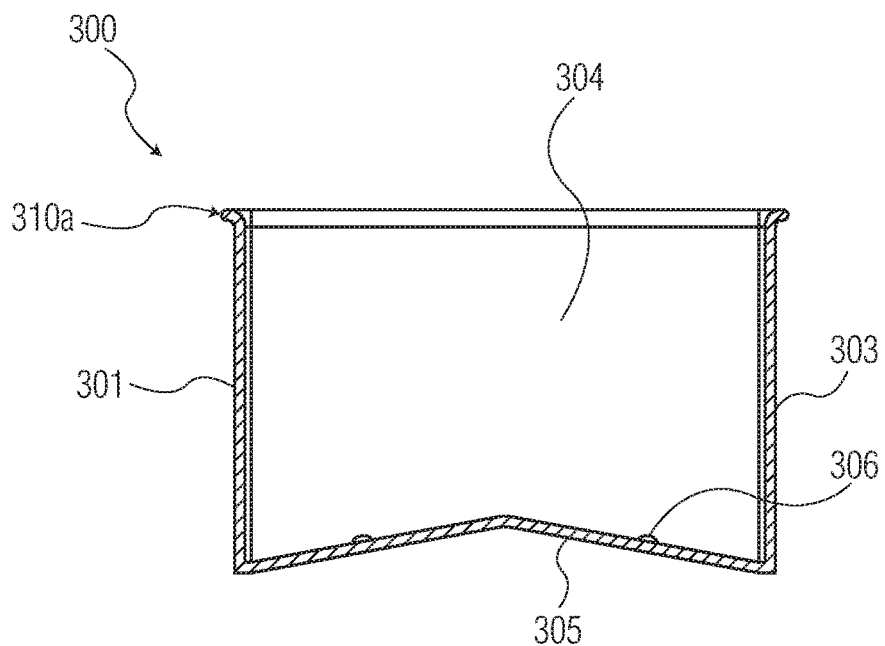
FIG. 13 is a sectional view of the controlled flow reservoir.

In an embodiment shown in FIGS. 12 and 13, the reservoir body 300 has a first sidewall 301, a second sidewall 302, a third sidewall 303, a fourth sidewall 304, and a base wall 305. The first sidewall 301 has a first top edge 301a, an opposing first bottom edge 301b, a first side edge 301c, and an opposing second side edge 301d. The second sidewall 302 has a second top edge 302a, an opposing second bottom edge 302b, a third side edge 302c, and an opposing fourth side edge 302d. The third sidewall 303 has a third top edge 303a, an opposing third bottom edge 303b, a fifth side edge 303c, and an opposing sixth side edge 303d. The fourth sidewall 304 has a fourth top edge 304a, an opposing fourth bottom edge 304b, a seventh side edge 304c, and an opposing eighth side edge 304d. The base wall 305 has a first base edge 305a, a second base edge 305b, a third base edge 305c, and fourth base edge 305d.

The first side edge 301c is connected to the eighth side edge 304d, the second side edge 301d is connected to the third side edge 302c, the fourth side edge 302d is connected to the fifth side edge 303c, and the sixth side edge 303d is connected to the seventh side edge 304c. The first bottom edge 301b is connected to the first base edge 305a, the second bottom edge 302b is connected to the second base edge 305b, the third bottom edge 303b is connected to the third base edge 305c, and the fourth bottom edge 304b is connected to the fourth base edge 305d.

Together, the first, second, third, and fourth sidewalls 301,302,303,304 and the base wall 305 form a water-tight, cup-like reservoir body 3 having the top opening 311 on a top side. In an embodiment, the first and third sidewalls 301,303 are approximately equal in length and width, and extend parallel to each other. In another embodiment, the second and fourth sidewalls 302,304 are approximately equal in length and width, and extend parallel to each other. The first and third sidewalls 301,303 extend perpendicular to the second and fourth sidewalls 302,304. A fluid receiving cavity 312 is disposed in the interior of the reservoir body 300.

A distance between an outer surface of the first and third sidewalls 301,303 is less than a diameter of the interior receiving cavity of the aeroponic growing column 1 described above. A distance between an outer surface of the second and fourth sidewalls 302,304 is less than the diameter of the interior receiving cavity of the aeroponic growing column 1 described above.

In another embodiment (not shown), the reservoir body 300 includes a circular sidewall, and the base wall 305. The base wall 305 is connected continuously to a bottom edge of the circular sidewall to form a water tight, cylindrical, cup-like structure having the fluid receiving cavity 312 disposed in the interior of the reservoir body 300. A diameter measured from an outer surface to an outer surface of the circular sidewall is less than the diameter of the interior receiving cavity of the aeroponic growing column 1 described above.

In an embodiment shown in FIGS. 12 and 13, the base wall 305 is concave and extends into the fluid receiving cavity 312. In one embodiment, the base wall 305 has a concave, cone-like shape. In the embodiment shown in FIG. 12, the base wall 305 has four triangular elements extending inward into the fluid receiving cavity 312, where each triangular element sits on a plane that extends obliquely from a plane formed by the first, second, third, and fourth bottom edges 301b,302b,303b,304b. In another embodiment, the base wall 305 is flat.

The plurality of fluid dispersing passageways 306 are positioned in the first, second, third, and fourth sidewalls 301,302,303,304, proximate to the base wall 305. The fluid dispersing passageways 306 extend from the interior of the controlled flow reservoir 3 to the exterior to for a through-hole. The shape of the fluid dispersing passageways 306 can be circular, square, oval, rectangular, hexagonal, triangular, or any other shape that allows the nutrient enriched fluid 160 in the controlled flow reservoir 3 to drain. The diameter of the fluid dispersing passageways 306 can be increased or decreased to increase or decrease the rate of nutrient enriched fluid 160 flow out of the controlled flow reservoir 3. In the embodiments where the base wall 305 is concave, an inner surface of the base wall 305 slopes towards the plurality of fluid dispersing passageways 306 to drain the nutrient enriched fluid 160 towards the fluid dispersing passageways 306.

The flange 310 is positioned along the top edges 301a, 302a, 303a, and 304a of the sidewalls 301, 302, 303, 304 or along the single sidewall of the circular sidewall. The diameter of an outer circumferential edge 310a of the flange 310 is equal to a diameter of the fluid receiving end 11 of the first body 10 for the aeroponic growing column 1 described above.

To install the controlled flow reservoir 3 on the aeroponic growing column 1, the controlled flow reservoir 3 is positioned on the fluid receiving end 11 of the first body 10 such that the reservoir body 3 extends into the interior receiving cavity of the first body 10. The flange 310 rests on the fluid receiving end 11 and the outer circumferential edge 310a is flush with an outer surface of the first body 10. The fluid receiving cap 20 is then positioned on the fluid receiving end 11.

In an embodiment, the controlled flow reservoir 3 is incorporated into the aeroponic growing column system 100 described above when a plurality of aeroponic growing columns 1 are used. In this embodiment, the plurality of sprayers 150 are replaced with a plurality of float valves 151 connected to the supply conduit 111. The float valves 151 are positioned in the sprayer receiving holes 22 and extend into the fluid receiving cavities 312 of the controlled flow reservoirs 3. As the pump 113 pushes the nutrient enriched fluid 160 through the supply conduit 111 from the reservoir 110, the float valves 151 disperse the nutrient enriched fluid 160 into the fluid receiving cavity 312 at a rate that is greater than the rate that the nutrient enriched fluid 160 flows out of the fluid dispersing passageways 306. The level of the nutrient enriched fluid 160 in the fluid receiving cavities 312 will then rise towards the float valve 151. When the level of the nutrient enriched fluid 160 reaches a float in the float valve 151, the float will rise along with the level of the nutrient enriched fluid 160 until a preset level is reached. The float valve 151 will then shut off the flow of the nutrient enriched fluid 160 into the fluid receiving cavity 312 until the level drops below a predetermined threshold level, at which time the float valve 141 will then open to allow the nutrient enriched fluid 160 to again fill the fluid receiving cavity. By regulating the flow and quantity of nutrient enriched fluid 160 within each column 1, the pressure in the supply conduit 111 is increased, allowing greater flow to reach subsequent columns 1 positioned further along the supply conduit 111.

Figure 10:
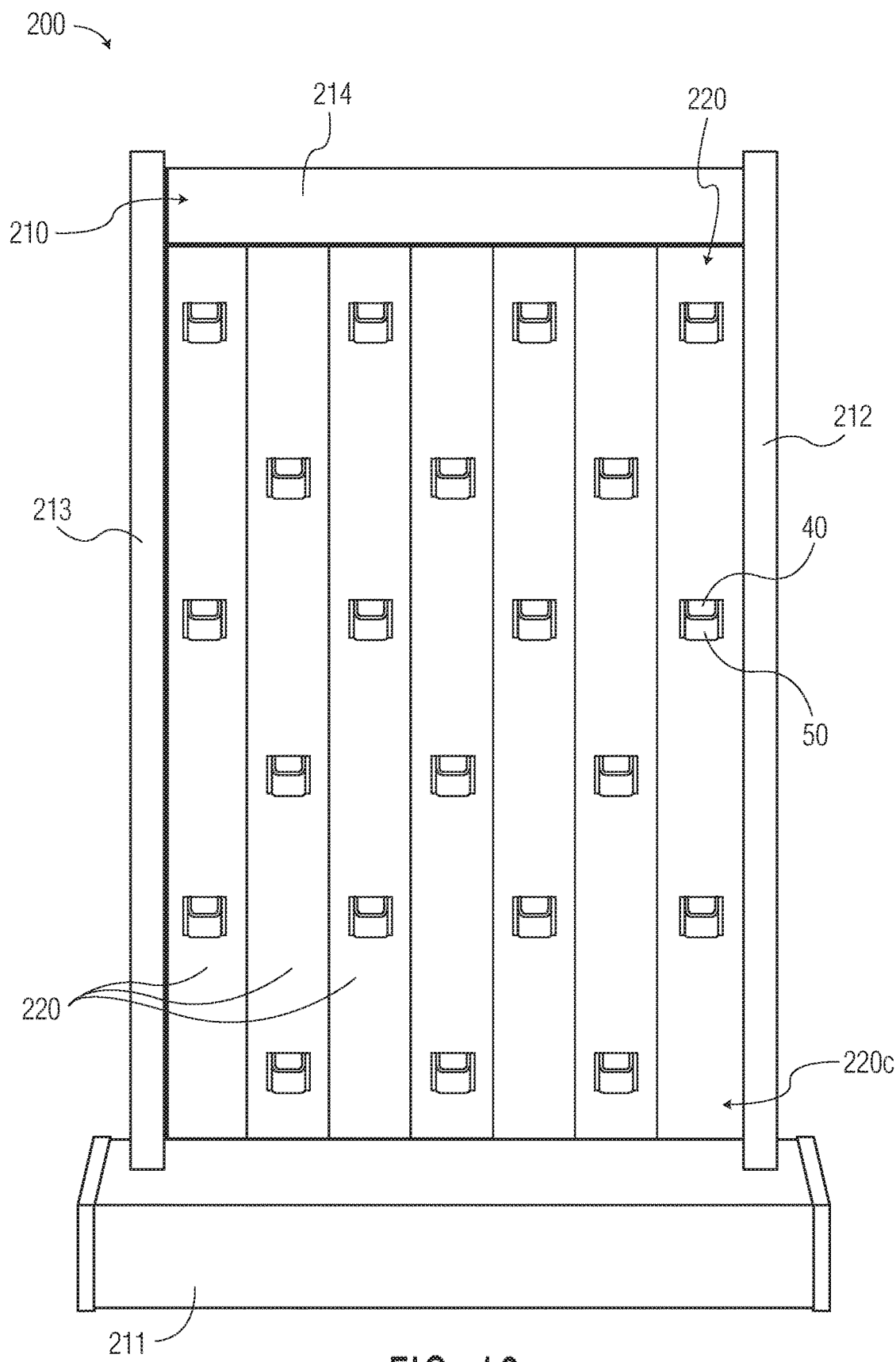
FIG. 10 is a plan view of an aeroponic growing wall system.
Figure 11:
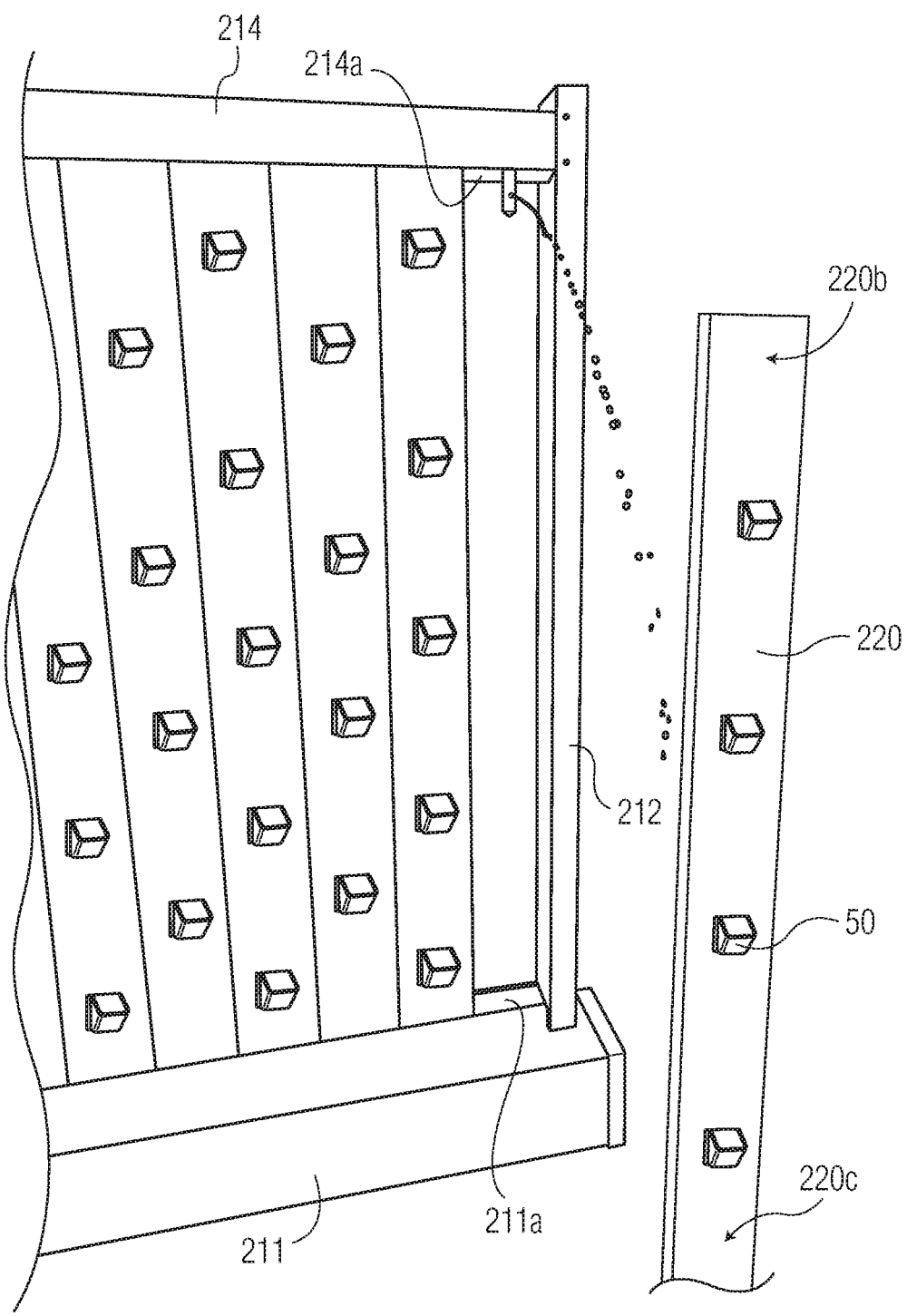
FIG. 11 is a partially exploded view of FIG. 10.

An embodiment of an aeroponic growing wall system 200 is disclosed in FIGS. 10 and 11 having a frame 210, a plurality of vertical growth columns 220, a supply conduit 230, the plurality of sprayers 150, the pump 113, and the nutrient enriched fluid 160.

The frame 210 includes a reservoir base 211, a first frame 212, a second frame 213, and a crossmember 214. The reservoir base 211 is elongated with a first end and an opposing second end and has a U-shaped fluid draining groove 211a extending between the first end and second end in the shape of a trough. One or more through-holes (not shown) are positioned within the trough of the fluid draining groove 211a, to allow any nutrient enriched fluid 160 in the fluid draining groove 211a to drain into the reservoir base 211. The reservoir base 211 holds the nutrient enriched fluid 160, discussed in the embodiments above. In an embodiment the frame 210 is made of polyethylene, polypropylene, polyvinylchloride, or acrylonitrile butadiene styrene. In another embodiment, the frame 210 may be made of a metal, such as stainless steel, aluminum, or any other metal known to those of ordinary skill in the art. In yet another embodiment, the frame 210 may be made of a combination of the above materials.

The first frame 212 extends vertically from the first end of the reservoir base 211, and the second frame 213 extends vertically from the second end of the reservoir base 211, parallel to the first frame member 212. In an embodiment, both the first frame 212 and/or the second frame 213 are hollow and have an interior receiving cavity (not shown). The first and second frames 212,213 may be rectangular, square, round, oval, or any other shape.

As shown in FIG. 10, the crossmember 214 extends horizontally between the first frame 212 and the second frame 213 and is connected at each end thereto. As shown in FIG. 11, the crossmember 214 has a U-shaped groove 214a open towards the reservoir base.

In an embodiment shown in FIGS. 10 and 11, each column 220 has a hollow interior receiving space 220a, a top end 220b, a base end 220c, and the plurality of growing receptacle receiving openings 40.

As shown in FIG. 10, the plurality of vertical growth columns 220 are positioned adjacent to each other to form a wall. A portion of the top end 220b of each column 220 is positioned within the U-shaped groove 214a of the crossmember 214, and a portion of the base end 220c is positioned in the fluid draining groove 211a of the reservoir base 211. The weight of the columns 220 is supported by the reservoir base 211.

Similar to the embodiments described above for the column 1, the plurality of growing receptacle receiving openings 40 are disposed on an exterior surface of the columns 220. Also similar to the embodiments described above for the column 1, the plurality of growing receptacles 50 are positioned over the growing receptacle receiving holes 40, and have the same embodiments previously discussed.

In an embodiment, the vertical growth columns 220 are made of polyethylene, polypropylene, polyvinylchloride, or acrylonitrile butadiene styrene. In another embodiment, the vertical growth columns 220 may be made of a metal, such as stainless steel, aluminum, or any other metal known to those of ordinary skill in the art.

The supply conduit 230 may be a pipe, rigid or flexible tubing, or any other conduit know to those of ordinary skill in the art. In an embodiment, the supply conduit 230 extends vertically out from a first or second end of the reservoir base 211, through the interior receiving cavity of the first frame 212 or the second frame 213, and then bends horizontally to extend into the U-shaped groove 214a of the crossmember 214.

In an embodiment, the supply conduit 230 is made of polyethylene, polypropylene, polyvinylchloride, or acrylonitrile butadiene styrene. In another embodiment, the supply conduit 230 may be made of a metal, such as stainless steel, aluminum, or any other metal known to those of ordinary skill in the art.

The plurality of sprayers 150 are connected to a portion of the supply conduit 230 positioned in the U-shaped groove 214a of the crossmember 214. Each sprayer 150 extends out of the crossmember 214 at a distance, towards the reservoir base 211. When the columns 220 are positioned in the frame 210, each sprayer 150 extends through the top end 220b of each column 220, and into the interior receiving space 220a.

The pump 113 positioned in the reservoir base 211 and is connected to the supply conduit 230. The pump 113 supplies the nutrient enriched fluid 160 from the reservoir base 110 to the plurality of sprayers 150 through the supply conduit 230. In an embodiment, a filter (not shown) can be positioned on the supply conduit 230 or to an inlet of the pump 113, between the reservoir base 211 and the sprayers 150 to remove impurities from the nutrient enriched fluid 160. A power supply (not shown) is connected to the pump 113. In other embodiments, the pump 113 may be positioned outside the reservoir base 211, and be in fluid communication with the reservoir base 211 and the supply conduit 230 to supply the nutrient enriched fluid 160 to the sprayers 150.

In the above described embodiments, the vertical growth columns 220 are removably positioned within the frame 210, similar to the columns 1 disclosed in the embodiments above. Since the weight of the columns 220 is supported by the reservoir base 211, the columns 220 can easily be removed or installed into the aeroponic growing wall system 200. To install a column 220, the top end 220b of the column 220 is first tilted at an angle towards the sprayer 150. The sprayer 150 is then inserted into the hollow interior receiving space 220a, and the top end 220b is positioned within the U-shaped groove 214a of the crossmember 214. Next, the column 220 is brought into a vertical position and the base end 220c is positioned over the fluid draining groove 211a of the reservoir base 211. The column 220 is then lowered such that the base end 220c is inserted into the fluid draining groove 211a until the weight of column 220 is supported by the reservoir base 211. To remove the column 220, the process is repeated in reverse.

The method of operation for the aeroponic growing wall system 200 is as follows. The pump 113 pushes the nutrient enriched fluid 160 through the supply conduit 230 from the reservoir base 211, upwards to the plurality of sprayers 150. The sprayers 150 then disperse the nutrient enriched fluid 160 into the interior receiving cavity of each vertical growth column 220 as a mist, fog, or spray. The nutrient enriched fluid 160 then travels down the length of each vertical growth column 220, from the top end 220b to the base end 220c through the use of gravitational pull. Excess nutrient enriched fluid 160 not used by the growing plants then drains from the base ends 220c of the columns 220 into the U-shaped fluid draining groove 211a of the reservoir base 211, and ultimately back into the reservoir base 211 through the through-holes to be reused.

Figure 15:
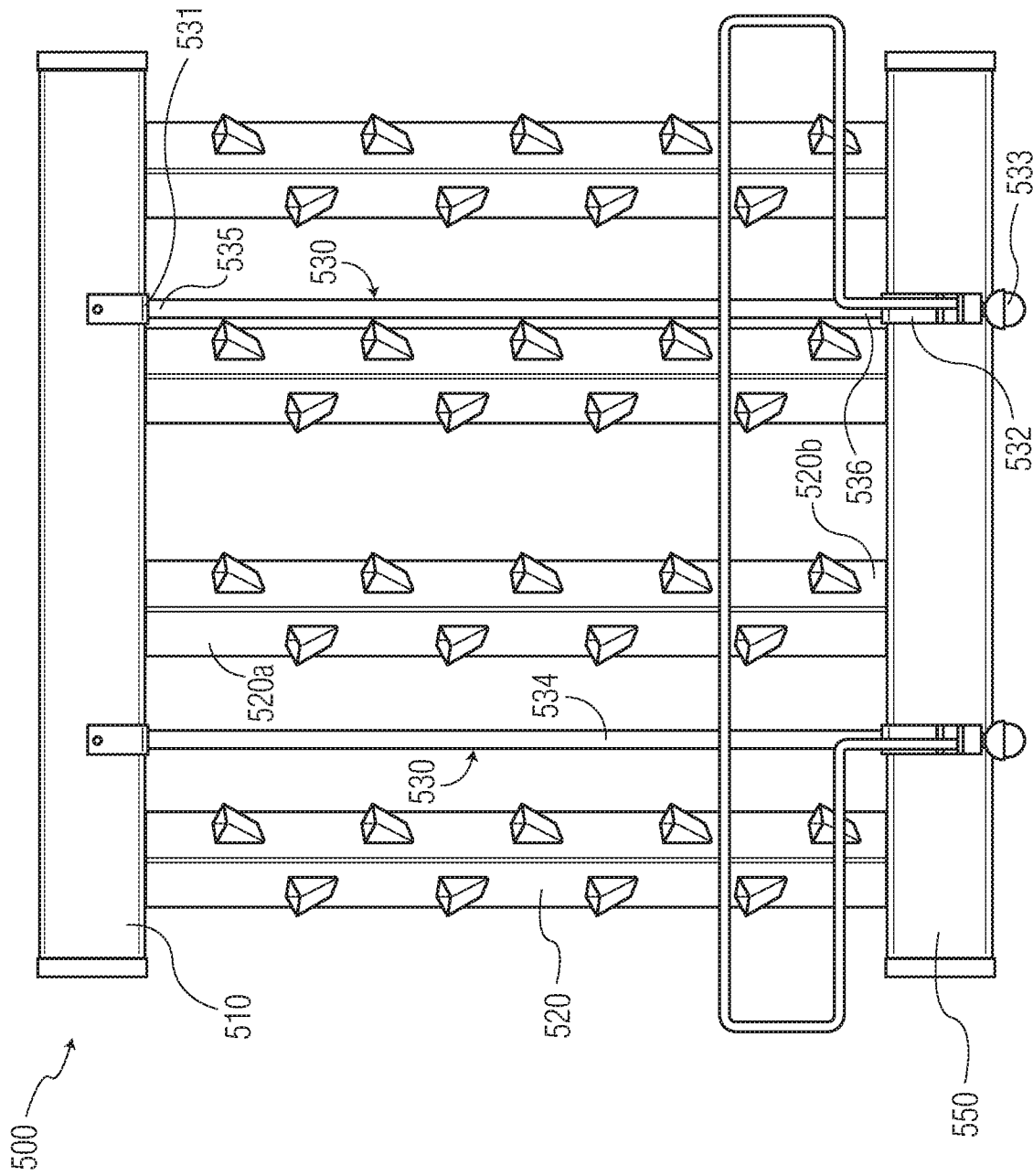
FIG. 15 is a front view of another embodiment of an aeroponic growing column system.

An embodiment of an aeroponic growing column system 500 is disclosed in FIG. 15 having a manifold housing 510, a reservoir base 550, a plurality of vertical growth columns 520, a manifold 540, at least two braces 530, the plurality of sprayers 150, the pump 113, and the nutrient enriched fluid 160.

Figure 16:
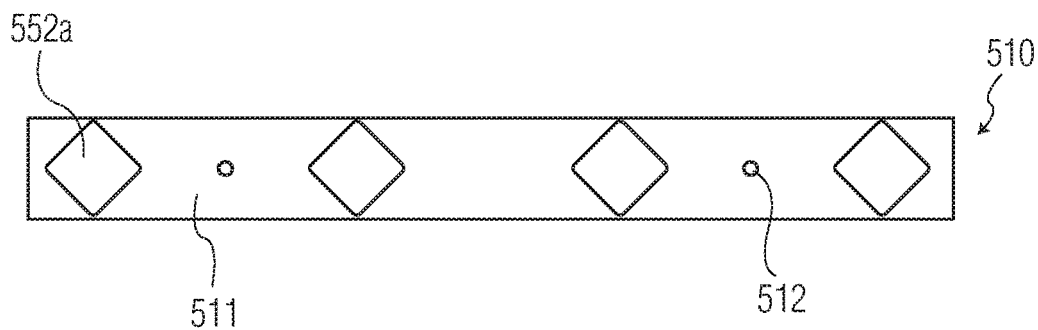
FIG. 16 is a plan view of a manifold housing according to the embodiment of FIG. 15.

As shown in FIGS. 15 and 16, the manifold housing 510 has an elongated body 511 in the shape of a square or rectangle with a manifold receiving space (not shown) disposed within the body 511. One or more column receiving holes 552a are disposed in a bottom surface of the manifold housing 510. The column receiving holes 552a are through-holes that hold the vertical growth columns 520 in a vertical orientation. In another embodiment, two, three, four, or more column receiving holes 552a are disposed in the manifold housing 510. At least one conduit receiving opening 512 is disposed in the bottom surface of the manifold housing 510 between two of the column receiving holes 552a. In an embodiment the manifold housing 510 is made of polyethylene, polypropylene, polyvinylchloride, or acrylonitrile butadiene styrene. In another embodiment, the manifold housing 510 may be made of a metal, such as stainless steel, aluminum, or any other metal known to those of ordinary skill in the art.

Figure 17:
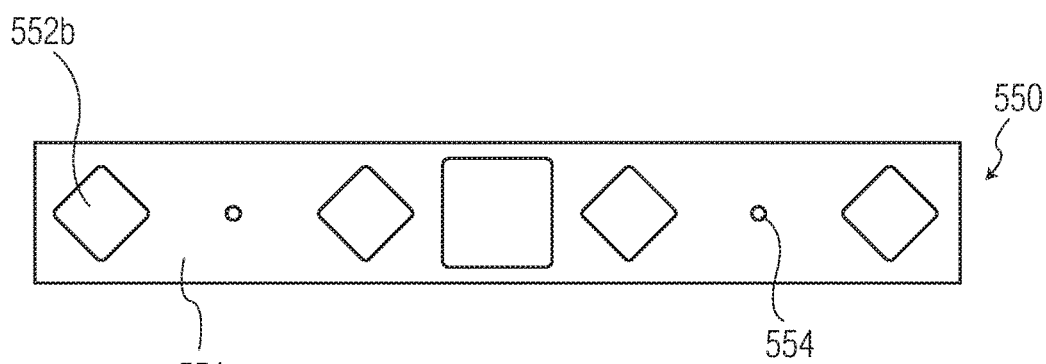
FIG. 17 is a plan view of a reservoir base according to the embodiment of FIG. 15.

As shown in FIGS. 15 and 17, the reservoir base 550 has an elongated body 551 in the shape of a square or rectangle with a nutrient enriched fluid receiving space (not shown) disposed within the body 551. One or more column receiving holes 552b are disposed in a top surface of the reservoir base 550. The column receiving holes 552b are through-holes that hold the vertical growth columns 520 in a vertical orientation, and allow any nutrient enriched fluid 160 in the vertical growth columns 520 to drain into the reservoir base 550. The number of column receiving holes 552b in the reservoir base 550 is equal to the number of column receiving holes 552a in the manifold housing 510. The spacing of the column receiving holes 552b along the top surface of the reservoir base 550 corresponds to the spacing of the column receiving holes 552a in the manifold housing 510. An access hole 553 is disposed in the top surface of the reservoir base 550 at an approximate midpoint. The access hole 553 is a through-hole that provides access to the nutrient enriched fluid receiving space (not shown) to access and position the pump 113. At least one conduit receiving opening 554 is disposed in the top surface of the reservoir base 550, between two of the column receiving holes 552b. The position of the conduit receiving opening 554 along the top surface of the reservoir base 550 corresponds to the position of the conduit receiving opening 512 on the bottom surface of the manifold housing 510, such that the conduit receiving opening 512 is positioned directly above the conduit receiving opening 554. The reservoir base 550 holds the nutrient enriched fluid 160, discussed in the embodiments above. In an embodiment the reservoir base 550 is made of polyethylene, polypropylene, polyvinylchloride, or acrylonitrile butadiene styrene. In another embodiment, the reservoir base 550 may be made of a metal, such as stainless steel, aluminum, or any other metal known to those of ordinary skill in the art.

Each column 520 has a structure as discussed in the above embodiments of the aeroponic growing column 1. Further, each column 520 includes a top end 520a and a base end 520b.

As shown in FIG. 15, the vertical growth columns 520 are positioned next to, and spaced apart from each other. A portion of the top end 520a of each column 520 is positioned within the column receiving holes 552a in the manifold housing 510 and a portion of the base end 520b is positioned in the column receiving holes 552b of the reservoir base 550. The weight of the columns 520 is supported by the reservoir base 550. In the embodiment shown in FIG. 15, four vertical growth columns 520 are used. However, in other embodiments, two, three, or more vertical growth columns 520 are used.

Similar to the embodiments described above for the column 1, the plurality of growing receptacle receiving openings 40 are disposed on an exterior surface of the columns 520. Also similar to the embodiments described above for the column 1, the plurality of growing receptacles 50 are positioned over the growing receptacle receiving holes 40, and have the same embodiments previously discussed.

In further embodiments, the vertical growth columns 520 can include the above described fluid receiving caps 20 or 20a, the base cap 30, and the controlled flow reservoir 3.

In an embodiment, the vertical growth columns 520 are made of polyethylene, polypropylene, polyvinylchloride, or acrylonitrile butadiene styrene. In another embodiment, the vertical growth columns 520 may be made of a metal, such as stainless steel, aluminum, or any other metal known to those of ordinary skill in the art.

Figure 18:
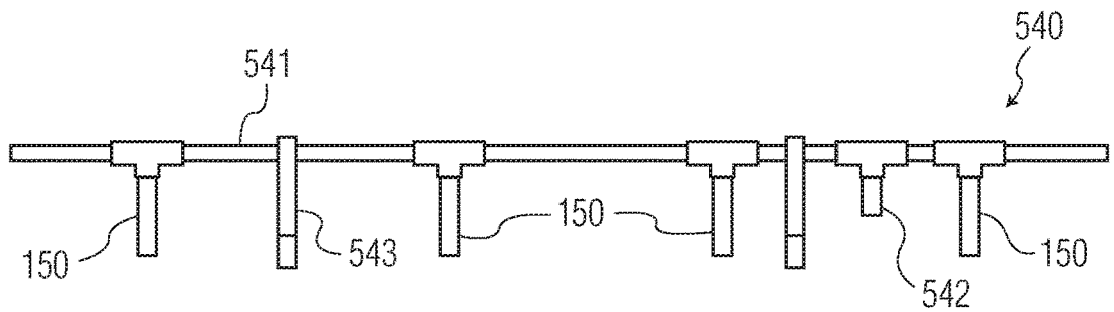
FIG. 18 is a front view of a manifold according to the embodiment of FIG. 15.

An embodiment of the manifold 540 is shown in FIG. 18. The manifold 540 includes a central connecting conduit 541, a plurality of sprayers 150, an intake port 542, and at least one manifold brace 543.

The manifold 540 is positioned within the manifold receiving space of the manifold housing 510. The central connecting conduit 541 extends along the length of the manifold housing 510, and is in fluid communication with the reservoir base 550. In an embodiment the central connecting conduit 541 is made of polyethylene, polypropylene, polyvinylchloride, or acrylonitrile butadiene styrene. In another embodiment, the central connecting conduit may be made of a metal, such as stainless steel, aluminum, copper or any other metal known to those of ordinary skill in the art.

The plurality of sprayers 150 are attached to the central connecting conduit 541 at intervals corresponding to the locations of the column receiving holes 552a. Each sprayer 150 is in fluid communication with the reservoir base 550, and extends out of the manifold housing 510 at a distance, towards the reservoir base 211, and through the column receiving hole 552a. When the columns 520 are positioned in the frame 210, each sprayer 150 extends through the top end 520a of each column 520, and into an interior receiving space of the column 520. While the interior receiving space is not shown, it is substantially similar to the hollow interior receiving space 220a discussed in the embodiments above. The number of sprayers 150 is equal to the number of column receiving holes 552a and to the number of vertical growth columns 520.

The intake port 542 extends from the central connecting conduit 541 at a location corresponding to the conduit receiving opening 512. The intake port 542 is in fluid communication with the reservoir base 550, and extends vertically towards the conduit receiving opening 512. In an embodiment the intake port 542 is made of polyethylene, polypropylene, polyvinylchloride, or acrylonitrile butadiene styrene. In another embodiment, the intake port 542 may be made of a metal, such as stainless steel, aluminum, or any other metal known to those of ordinary skill in the art.

Figure 19:
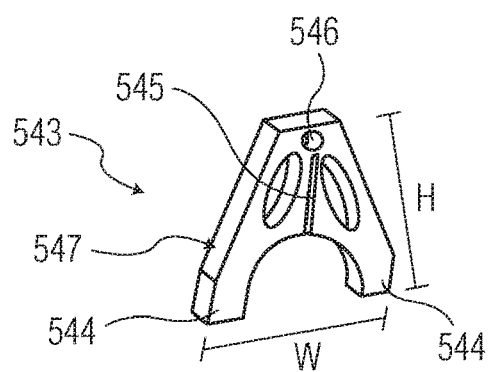
FIG. 19 is a perspective view of a manifold brace according to the embodiment of FIG. 15.

An embodiment of the manifold brace 543 is shown in FIG. 19. The manifold brace 543 has an approximate A-shape, and includes a conduit receiving hole 546 and a bifurcated spring member 547.

The conduit receiving hole 546 is positioned proximate to an apex of the manifold brace 543. The central connecting conduit 541 extends through the conduit receiving hole 546, and is secured in the manifold receiving space of the manifold housing 510 by the manifold brace 543. A height H of the manifold brace 543 is less than or equal to a height of the manifold receiving space of the manifold housing 510.

As shown in the embodiment in FIG. 19, the bifurcated spring member 547 includes a pair of legs 544 separated by a slot 545 and a lower recess. The slot 545 extends along a central portion of the manifold brace 543 from the lower recess towards the apex, before terminating at a distance from the conduit receiving hole 546.

A relaxed width W between the outermost edges of the legs 544 is greater than a width of the manifold receiving space of the manifold housing 510. To insert the manifold brace 543 into the manifold receiving space, compressive forces are placed on the legs 544 to displace the legs 544 toward each other under tension. Since the slot 545 separates the pair of legs 544, the legs 544 can be displaced towards each other such that the width W between the outermost edges of the legs 544 is less than the width of the manifold receiving space. The manifold brace 543 can then be inserted into the manifold receiving space and the compressive forces removed from the legs 544. The legs 544 relax outward and contact the inner surfaces of the manifold receiving space. Since the relaxed width W is greater than the width of the manifold receiving space, the legs 544 apply pressure against the inner surfaces of the manifold receiving space to pressure fit the manifold brace 543 within the manifold housing 510.

As shown in FIG. 15, the braces 530 include a supply conduit 534, a manifold collar 531, and a base collar 532. In an embodiment shown in FIG. 15, two braces 530 are used. However, one skilled in the art would appreciate that additional braces 530 can also be used for further support. In the embodiment shown, the brace 530 is made of aluminum, but other materials such as metals like stainless steel or copper, composites, or plastics can also be used.

The supply conduit 534 extends vertically from the reservoir base 550 to the manifold housing 510. The manifold collar 531 is connected to a first end 535, and the base collar 532 is connected to a second end 536.

In an embodiment, the first end 535 of one of the braces 530 is positioned over the conduit receiving opening 512 in the manifold housing 510, and the second end 536 is positioned over the conduit receiving opening 554 in the reservoir base 550. The first end 535 is connected to the intake port 542 of the manifold 540, and is in fluid communication with the reservoir base 550 and the manifold 540.

As shown in the embodiment in FIG. 15, the manifold collar 531 is a cradle upon which the manifold housing 510 rests. The manifold collar 531 is secured to the manifold housing 510 by fastening devices such as screws, rivets, or other common fastening devices known to those of ordinary skill in the art. In other embodiments, the manifold collar 531 is a strap that extends around the circumference of the manifold housing 510.

The base collar 532 extends around the circumference of the reservoir base 550. The base collar 532 and the reservoir base 550 support the weight of the manifold housing 510, manifold, 540, and vertical growth columns 520. Further embodiments include a pair of castor wheels 533 attached to the base collar 532.

While the above embodiments disclose a brace 530 whose supply conduit 534 is in fluid communication with the reservoir base 550 and the manifold 540, additional braces 530 may not be in fluid communication. These additional support braces 530 are attached in a similar manner as described above, but are positioned away from the conduit receiving openings 512, 554. Such braces 530 provide structural support, but are not in fluid communication.

The pump 113 positioned in the reservoir base 550 and is connected to the supply conduit 534 in fluid communication with the manifold 540. The pump 113 supplies the nutrient enriched fluid 160 from the reservoir base 110 to the plurality of sprayers 150 through the supply conduit 534. In an embodiment, a filter (not shown) can be positioned between the pump 113 and the supply conduit 534 or at an inlet of the pump 113, between the reservoir base 550 and the sprayers 150 to remove impurities from the nutrient enriched fluid 160. A power supply (not shown) is connected to the pump 113. In other embodiments, the pump 113 may be positioned outside the reservoir base 550, and be in fluid communication with the reservoir base 550 and the supply conduit 534 to supply the nutrient enriched fluid 160 to the sprayers 150.

Further embodiments include a programmable timer (not shown) connected to the power supply to control the operation of the pump 113.

In the above described embodiments, the vertical growth columns 520 are removably positioned within the column receiving openings 552a, 552b, similar to the columns 1 disclosed above. Since the weight of the columns 520 is supported by the reservoir base 550, the columns 520 can easily be removed or installed into the aeroponic growing column system 500. To install a column 520, the top end 520a of the column 520 is first tilted at an angle towards the sprayer 150. The sprayer 150 is then inserted into the hollow interior receiving space of the column 520, and the top end 520a is positioned within the column receiving hole 552a. Next, the column 520 is brought into a vertical position and the base end 520b is positioned over the column receiving hole 552b of the reservoir base 550. The column 520 is then lowered such that the base end 520b is inserted into column receiving hole 552b until the weight of column 520 is supported by the reservoir base 550. To remove the column 520, the process is repeated in reverse.

The method of operation for the aeroponic growing column system 500 is as follows. The pump 113 pushes the nutrient enriched fluid 160 through the supply conduit 534 from the reservoir base 550, upwards to the plurality of sprayers 150. The nutrient enriched fluid 160 travels upward through the supply conduit 534 to the manifold 540, through the intake port 542 and the central connecting conduit 541 to the plurality of sprayers 150. The sprayers 150 then disperse the nutrient enriched fluid 160 into the interior receiving cavity of each vertical growth column 520 as a mist, fog, or spray. The nutrient enriched fluid 160 then travels down the length of each vertical growth column 520, from the top end 520a to the base end 520b through the use of gravitational pull. Excess nutrient enriched fluid 160 not used by the growing plants then drains from the base ends 520b of the columns 520 back into the reservoir base 550 through the column receiving holes 552b to be reused.

In another embodiment of the aeroponic growing column 1 or 520, the aeroponic growing column 1 or 520 further includes a distribution element 600. The distribution element 600 includes a planar surface 601, a distribution tube 604, and a distribution surface 606. The distribution element 600 will now be described in detail with reference to FIGS. 20 and 21.

Figure 20:
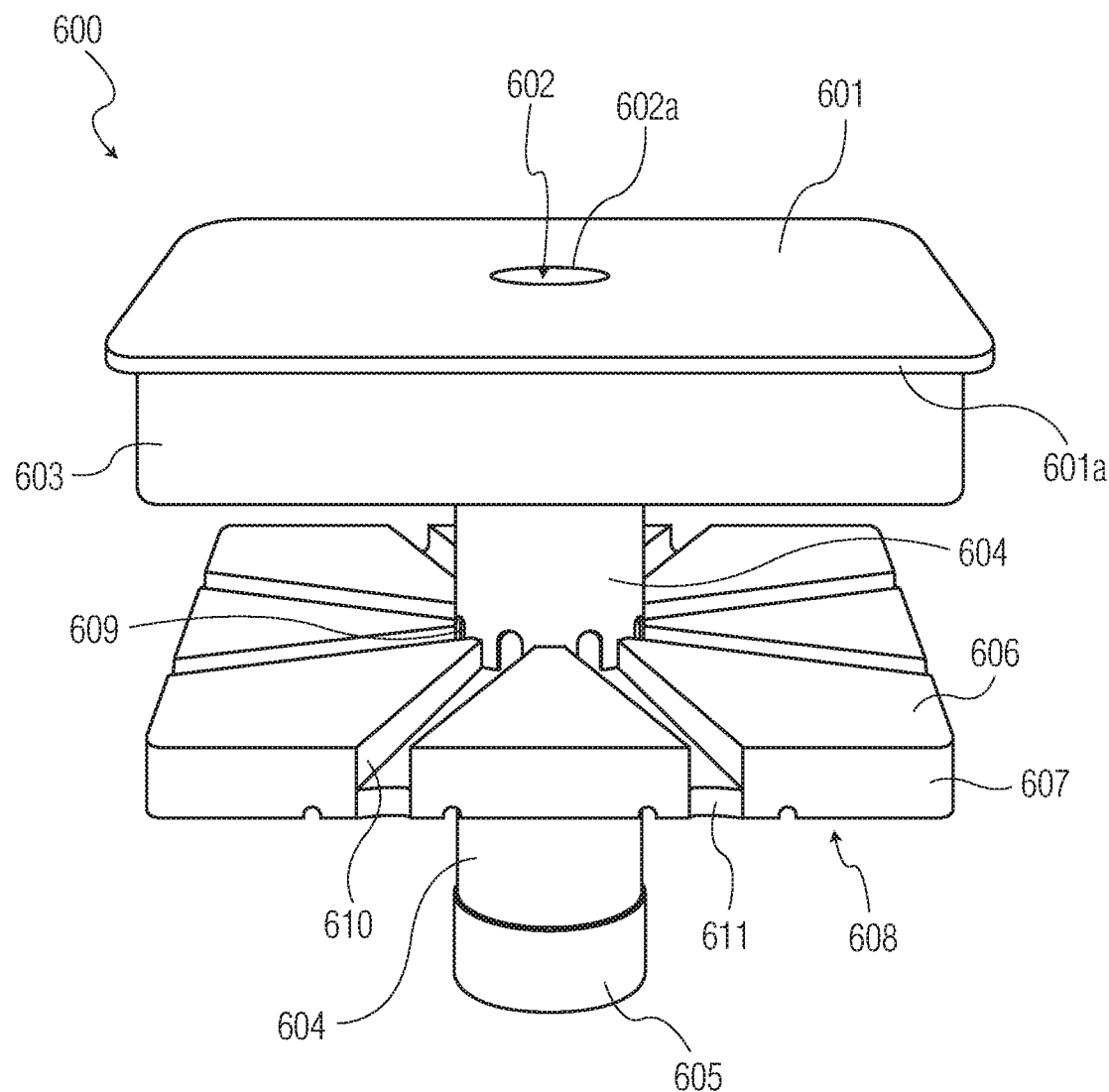
FIG. 20 is a perspective view of a distribution element.

The planar surface 601, as shown in FIG. 20, has a flange 601a formed on the edges of the planar surface 601, and a recess 602 defined by the annular edge 602a and extending through the planar surface 601. The planar surface 601 forms the top of the body 603. The body 603 extends in a direction orthogonal to the plane of the planar surface 601. The recess 602 also extends through the body 603.

A distribution tube 604 extends from the bottom of the body 603, connecting the body 603 to the distribution surface 606. The distribution tube 604 is hollow by virtue of containing the extension of the recess 602. A plurality of distribution holes 609 extend through the distribution tube 604 where the distribution tube 604 connects with the distribution surface 606. The distribution holes 609 can be circular, square, oval, rectangular, hexagonal, triangular, or any other shape that would permit the passage of fluid. The distribution tube 604 extends through the distribution surface 606 and away from the bottom of the distribution surface 608, and optionally has a cap 605 on a distal end. The distribution tube 604 shown in the embodiment of FIG. 20 is cylindrical, but one with skill in the art at the time of the invention would appreciate that the tube 604 could be a range of possible shapes.

The distribution surface 606 includes a plurality of first channels 610 corresponding to the distribution holes 609. The distribution surface 606 extends at an orthogonal angle with respect to the longitudinal axis of the distribution tube 604. The first channels 610 may extend radially from the connection to the distribution tube 604, and terminate at an edge surface 607. The edge surface 607 includes a plurality of second channels 611 corresponding to the plurality of first channels 610. The first channels 610 are shown with a square cross-section, but one with skill in the art at the time of the invention would appreciate that the cross-section could be a range of possible shapes. The second channels 611 are shown with an arc cross-section, but one with skill in the art at the time of the invention would appreciate that the cross-section could be a range of possible shapes.

Figure 21:
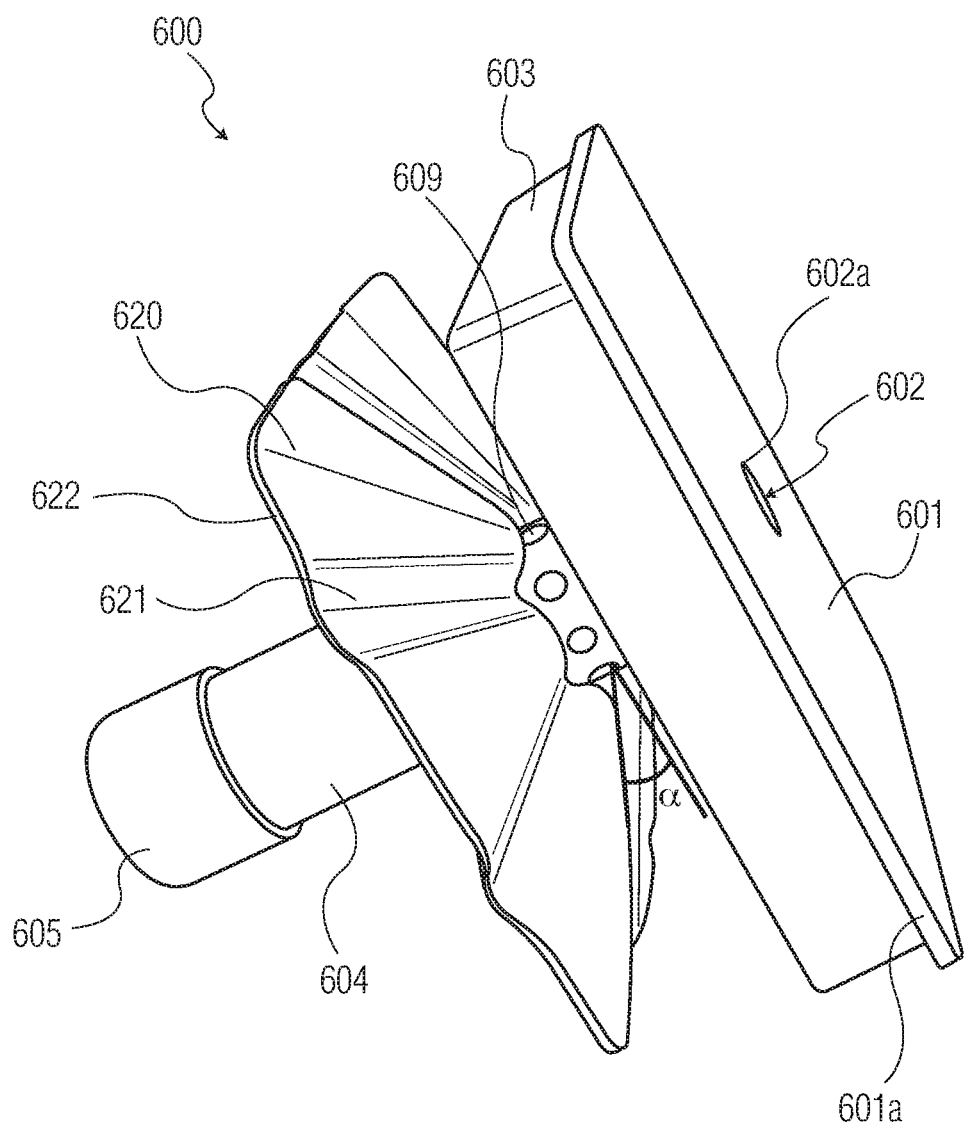
FIG. 21 is a perspective view of another embodiment of a distribution element.

An alternative embodiment of the distribution element 600 is shown in FIG. 21, wherein like numbers indicate like elements. The embodiment of FIG. 21 differs in the shape and structure of distribution surface 620. The distribution surface 620 extends from the distribution tube 604 at an angle $\alpha$ with respect to the plane defined by the body 603. The plurality of third channels 621 extend radially from the corresponding holes 609 at the angle $\alpha$, terminating at the edge surface 622. The third channels 621 are shown with a curved cross-section, but one with skill in the art at the time of the invention would appreciate that the cross-section could be a range of possible shapes.

The planar surface 601, flange 601a, body 603, and distribution surfaces 606, 620 are all shown as square elements in the embodiments of FIGS. 20 and 21. Each of these elements could alternatively be cylindrical as would be appreciated by one with skill in the art. The length of an edge of the squares 603 and 606 or 620 is less than the length of an edge of the interior receiving cavity of a square aeroponic growing column 1, 520. Alternatively, the diameter of the cylinders 603 and 606 or 620 is less than the diameter of the interior receiving cavity of a cylindrical aeroponic growing column 1, 520. The thickness of the flange 601a is equal to the thickness of the fluid receiving end 11 of the first body 1, or the thickness of the top end 520a of the column 520.

The installation of the distribution element 600 will now be described with reference to the aeroponic growing column 1, but would be identical to the installation on aeroponic growing column 520. The distribution element 600 is positioned on the fluid receiving end 11 of the first body 10 such that the body 603, distribution tube 604, and distribution surface 606 all extend into the interior receiving cavity of the first body 10. The flange 601a rests on the fluid receiving end 11, such that the flange 601a is flush with an outer surface of the first body 10. The distribution element 600 is thus used in lieu of controlled flow reservoir 3 and fluid receiving cap 20.

When used in the aeroponic growing column 1 within aeroponic growing system 100, or aeroponic growing column 520 within aeroponic growing system 500 described above, nutrient enriched fluid 160 flows into the recess 602 from a sprayer 150 extending into the proximal end of the distribution tube 604. The nutrient enriched fluid 160 is stopped by the cap 605 and begins to fill the recess 602 defined by the distribution tube 604. Once the level of the nutrient enriched fluid 160 reaches the holes 609, the fluid flows out the holes 609 and along the first channels 610. The fluid then reaches the second channels 611, and flows down alongside the interior surfaces of the columns 1, 520. Alternatively, in the embodiment of FIG. 21, the fluid flows out the holes 609, along the third channels 621, and down alongside the interior surfaces of the columns 1, 520. The holes 609 and channels 610, 611, and 621 can be sized to affect the rate of flow of the nutrient enriched fluid 160.

Figure 22:
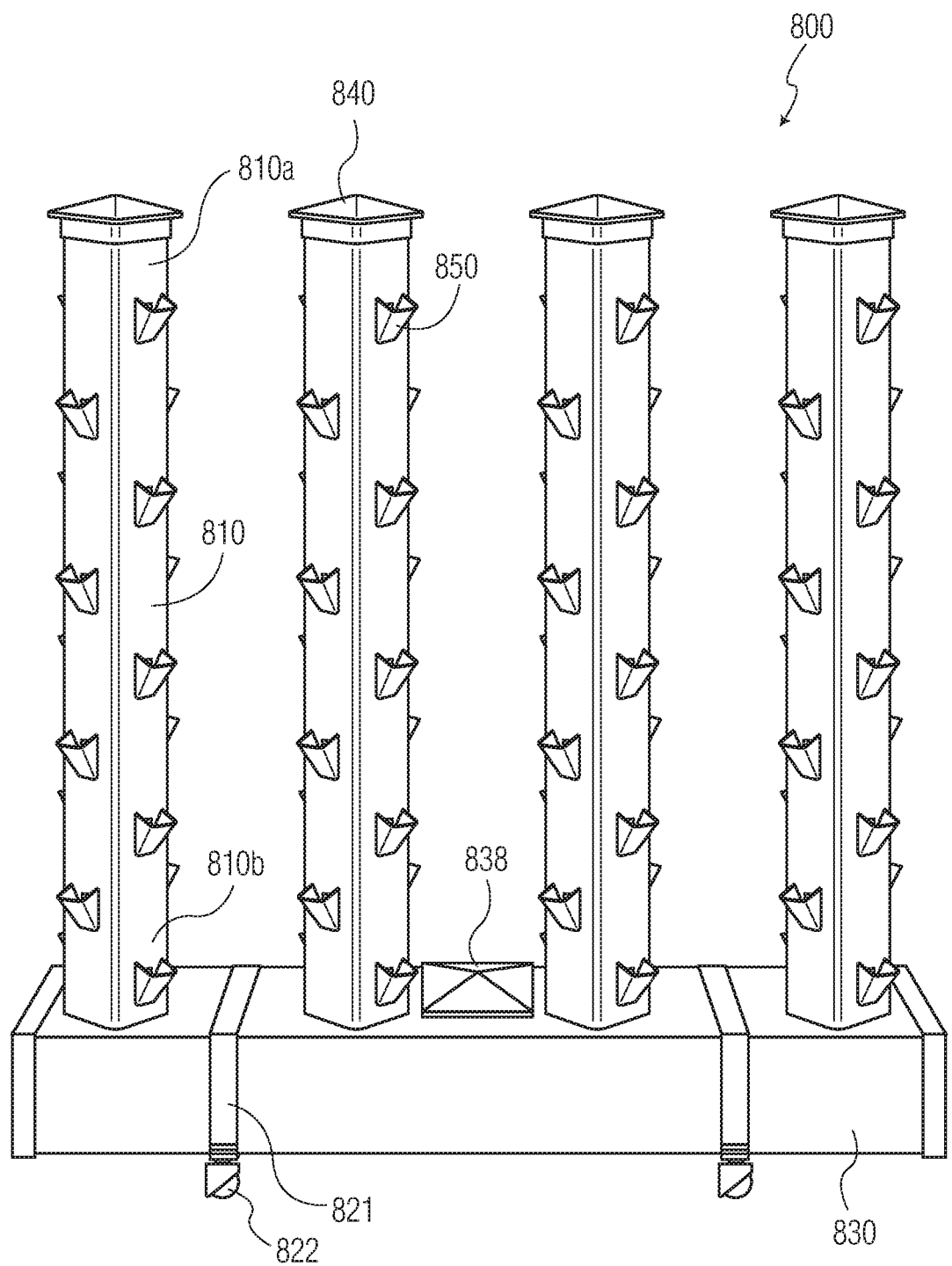
FIG. 22 is a front view of another embodiment of an aeroponic growing column system.

An embodiment of an aeroponic growing system 800 is shown in FIG. 22 having a plurality of vertical growth columns 810, end caps 840, a reservoir base 830, and base collars 821.

The growing columns 810 have a top end 810a and a bottom end 810b. The growing receptacles 850 are the same as the growing receptacles 50 described above with reference to FIGS. 5-7, and the growth columns 810 are of a similar structure discussed above in the aeroponic growing columns 1 and 520. The embodiment of FIG. 22 shows the growth columns 810 in a square shape, but as described above, the growth columns 810 could also be formed in a cylindrical shape.

Base collars 821 extend around the circumference of the reservoir base 830. Castor wheels 822 are attached to the base collars 821, such that the wheels 822 support the reservoir base 830 and the growth columns 810. In the embodiment shown, the base collars 821 are made of aluminum, but other materials such as metals like stainless steel or copper, composites, or plastics can also be used.

Figure 25:
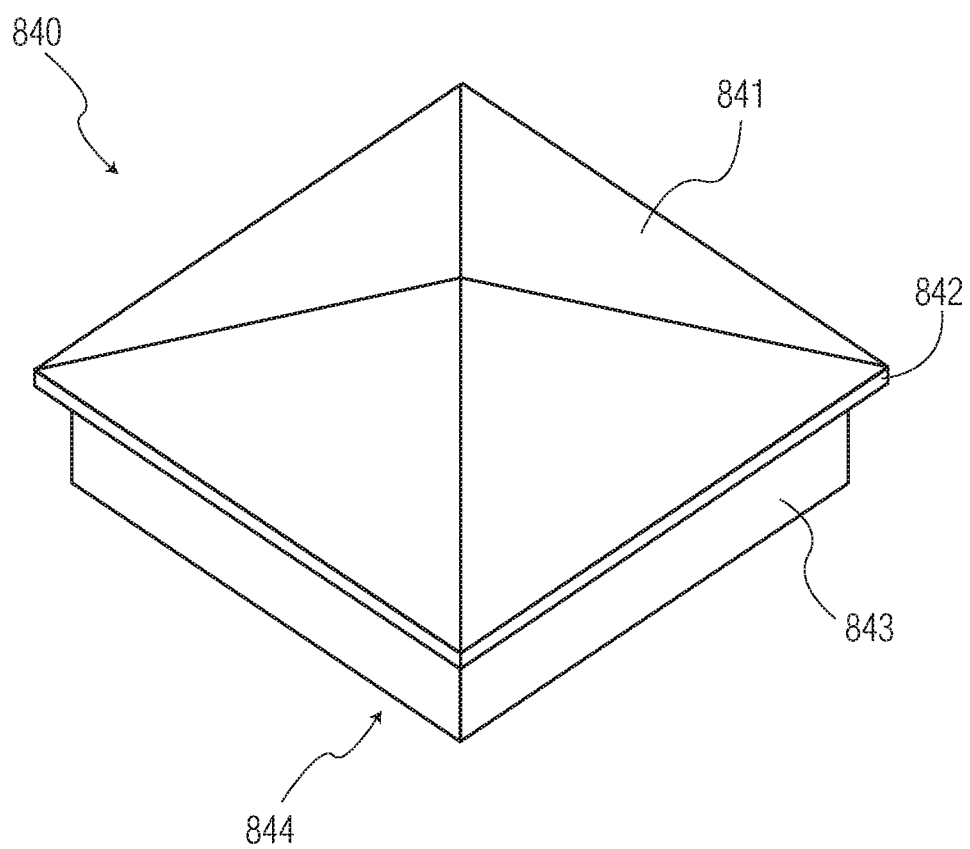
FIG. 25 is a perspective view of an end cap according to the embodiment of FIG. 22.

The end cap 840 is shown in detail in FIG. 25. The end cap 840 includes a top surface 841 including four triangular portions. These triangular portions are angled with respect to the horizontal, and meet at a top point, forming the top surface 841 as a four-sided pyramid shape. The top surface 841 has an edge 842 extending around a circumference thereof. A side surface 843 extends from the bottom of the top surface 841, and may be a square or cylindrical shape. The side surface 843 is positioned to form an overhang with the top surface 841 and the edge 842. Together, the side surface 843 and the top surface 841 define the interior receiving space 844. The length of an interior edge of the side surface 843 is greater than the length of the exterior edge of the top end 810a. Alternatively, the interior diameter of the side surface 843 is greater than the exterior diameter of the top end 810a.

Figure 23:
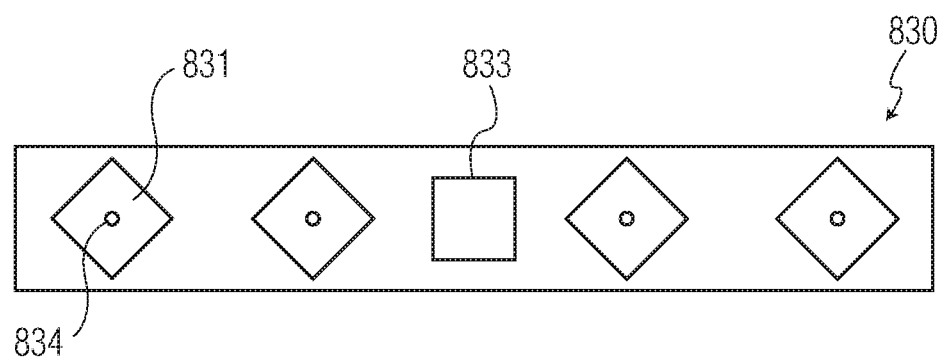
FIG. 23 is a plan view of a reservoir base according to the embodiment of FIG. 22.

As shown in FIGS. 22 and 23, the reservoir base 830 has a plurality of column receiving holes 831 disposed in the top surface thereof. A nutrient enriched fluid receiving space (not shown) is disposed within the reservoir body 830, and accessed via the access hole 833. An access hole cover 838 may be positioned over the access hole 833. The reservoir base holds the nutrient enriched fluid 160 and pump 113 discussed in the embodiments above. In an embodiment the reservoir base 830 is made of polyethylene, polypropylene, polyvinylchloride, or acrylonitrile butadiene styrene. In another embodiment, the reservoir base 830 may be made of a metal, such as stainless steel, aluminum, or any other metal known to those of ordinary skill in the art.

The assembly of the aeroponic growing system 800 will now be described. The bottom end 810b of the growth column 810 is inserted into the column receiving hole 831 such that the growth column 810 is supported by and extends vertically from the reservoir base 830. In the embodiment shown in FIG. 22, four vertical growth columns 810 are used, however, in other embodiments, two, three or more growth columns 810 could be used.

Figure 24:
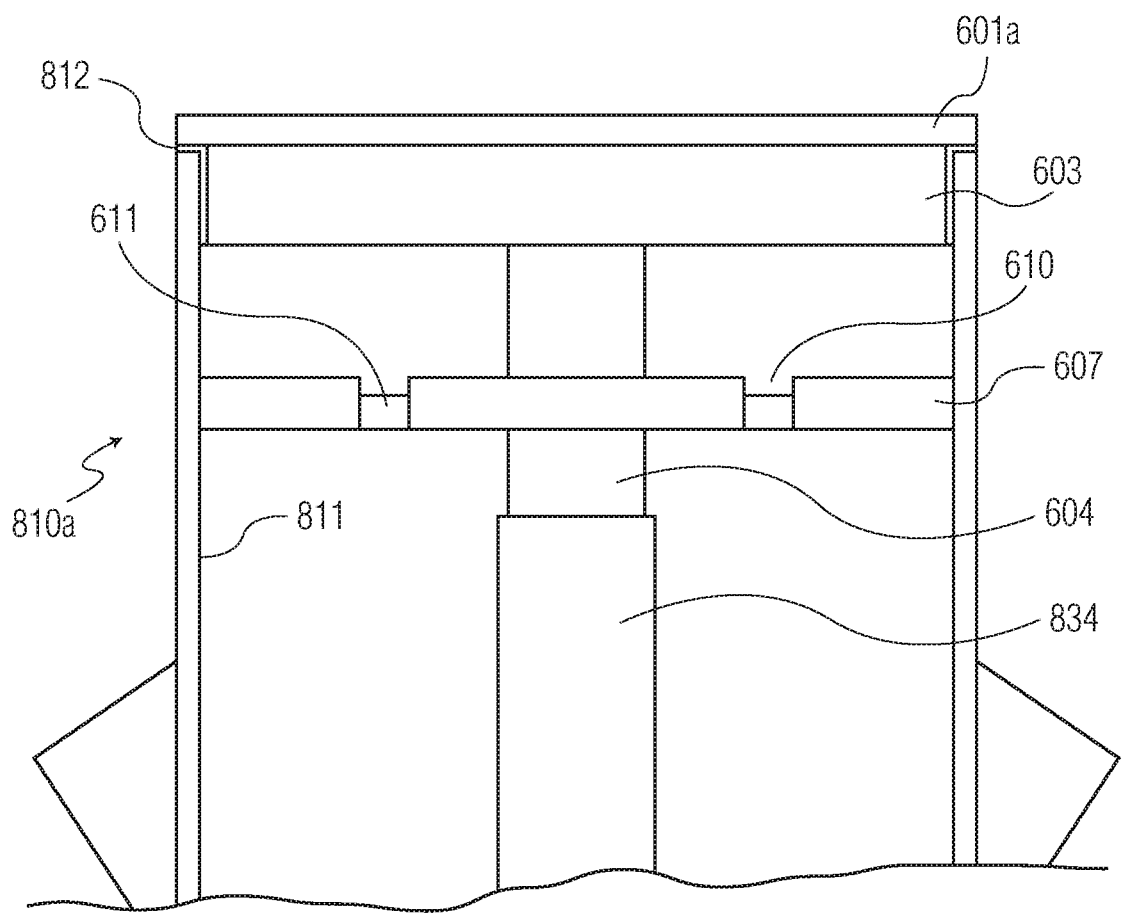
FIG. 24 is a sectional view of a growing column according to the embodiment of FIG. 22.

A supply conduit 834 extends from the pump 113 in the reservoir base 830, through the column receiving hole 831 as shown in FIG. 23, and vertically within the column 810. The supply conduit 834 may be a pipe, rigid or flexible tubing, or any other conduit know to those of ordinary skill in the art. As shown in FIG. 24, the supply conduit 834 connects to a distribution element 600 disposed within the top end 810a of the growth column 810. The embodiment of FIG. 24 shows the conduit connecting directly to the distal end of the distribution tube 604, but one with skill in the art would appreciate that, based on the relative diameters of the supply conduit 834 and distribution tube 604, intermediate elements could be used to connect the supply conduit 834 and the distribution tube 604. The distribution element 600 is positioned within the top end 810a as described above with reference to FIGS. 20 and 21 and shown in FIG. 24. In this embodiment, the distribution element 600 does not include the cap 605.

The end cap 840 is then positioned atop the growth column 810. The end cap 840 fits over the distribution element 600 and top end 810a depicted in FIG. 24, such that the interior edge of the side surface 843 contacts the exterior surface of the top end 810a and the outside edge of the flange 601a.

The method of operation for the aeroponic growing system 800 is as follows. The pump 113 pushes the nutrient enriched fluid 160 out from the reservoir base 830, through the supply conduit 834, and up into the distribution element 600 through the distribution tube 604. Once the level of the nutrient enriched fluid 160 reaches the holes 609, the fluid flows out the holes 609 and along the first channels 610 shown in FIG. 24. The fluid then reaches the second channels 611, and flows down alongside the interior surfaces 811 of the column 810 from the top end 810a to the bottom end 810b via gravity, contacting the plants in the growing receptacles 850. The column receiving holes 831 allow any excess nutrient enriched fluid 160 flowing down alongside the interior surfaces 811 to drain into the reservoir base 830, where the nutrient enriched fluid 160 is caught by the nutrient enriched fluid receiving space for reuse.

What is claimed is:

1. An aeroponic growing column system, comprising:
a plurality of vertical growth columns having an elongated body with a fluid receiving end at a top end, an opposite fluid draining end at a base end, an interior receiving space extending between the fluid receiving end and the fluid draining end, and a plurality of growing receptacle receiving openings positioned on the body;
a plurality of growing receptacles positioned in the growing receptacle receiving openings;

a reservoir base having a first plurality of column receiving holes, the fluid draining end of each vertical growth column is removably positioned in a different one of the first plurality of column receiving holes and supported by the reservoir base; and a manifold housing having a second plurality of column receiving holes, the fluid receiving end of each vertical growth column is positioned in one of the second plurality of column receiving holes, the manifold housing includes a central connecting conduit, a plurality of sprayers, at least one intake port, and at least one manifold brace.

2. The aeroponic growing column system of claim 1, wherein the reservoir base includes a pump and a fluid receiving space.

3. The aeroponic growing column system of claim 2, further comprising at least one supply conduit connected to the pump.

4. The aeroponic growing column system of claim 3, wherein each of the sprayers is positioned in the interior receiving space on the fluid receiving end of one of the plurality of vertical growth column.

5. The aeroponic growing column system of claim 4, wherein the central connecting conduit connects the plurality of sprayers and the at least one intake port in fluid communication, and the supply conduit connects the pump to the at least one intake port in fluid communication.

6. The aeroponic growing column system of claim 5, wherein the supply conduit extends through a first conduit receiving opening in the reservoir base, the first conduit receiving opening spaced apart from the first plurality of column receiving holes, and also extends through a second conduit receiving opening in the manifold housing, the second conduit receiving opening spaced apart from the second plurality of column receiving holes.

7. The aeroponic growing column system of claim 2, further comprising a plurality of base collars extending around the circumference of the reservoir base.

8. The aeroponic growing column system of claim 7, further comprising a plurality of wheels attached to the base collars and positioned on a side of the reservoir base opposite the plurality of column receiving holes.

9. The aeroponic growing column system of claim 1, further comprising a distribution element positioned in the interior receiving space on the fluid receiving end of each vertical growth column, the distribution element including a distribution tube having distribution holes, a cap attached to a distal end of the distribution tube, and a distribution surface having channels.

10. The aeroponic growing column system of claim 9, wherein the sprayer extends into a proximal end of the distribution tube.

11. The aeroponic growing column system of claim 1, wherein the manifold brace has a conduit receiving hole and a spring member, the central connecting conduit extending through the conduit receiving hole, and the manifold brace positioned within the manifold housing such that the spring member abut inner surfaces of the manifold housing.

* * * * *